US009876562B2

(12) United States Patent
Hall

(10) Patent No.: US 9,876,562 B2
(45) Date of Patent: Jan. 23, 2018

(54) BEAMSPACE-FREQUENCY ADAPTIVE PROCESSING FOR SATELLITE COMMUNICATIONS

(71) Applicant: Empire Technology Development LLC, Wilmington, DE (US)

(72) Inventor: James Stroman Hall, Orlando, FL (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 328 days.

(21) Appl. No.: 14/760,951

(22) PCT Filed: Jan. 14, 2014

(86) PCT No.: PCT/US2014/011495
§ 371 (c)(1),
(2) Date: Jul. 14, 2015

(87) PCT Pub. No.: WO2014/158310
PCT Pub. Date: Oct. 2, 2014

(65) Prior Publication Data
US 2015/0341110 A1 Nov. 26, 2015

Related U.S. Application Data

(60) Provisional application No. 61/752,573, filed on Jan. 15, 2013.

(51) Int. Cl.
*H04B 7/185* (2006.01)
*H04B 7/06* (2006.01)
(Continued)

(52) U.S. Cl.
CPC ....... *H04B 7/18519* (2013.01); *H04B 7/0421* (2013.01); *H04B 7/068* (2013.01);
(Continued)

(58) Field of Classification Search
CPC ...... H04B 7/042; H04B 7/0617; H04B 7/068; H04B 7/18519; H04B 7/18513
See application file for complete search history.

(56) References Cited

U.S. PATENT DOCUMENTS 6,157,811 A * 12/2000 Dent ..................... H01Q 1/288
455/12.1
6,240,072 B1 5/2001 Lo et al.
(Continued)

OTHER PUBLICATIONS

"EchoStar XVII satellite with Jupiter high-throughput technology successfully positioned in orbital slot," Hughes Network Systems, News Release, pp. 1-2 (Jul. 23, 2012).
(Continued)

*Primary Examiner* — Edan Orgad
*Assistant Examiner* — Nourali Mansoury
(74) *Attorney, Agent, or Firm* — Workman Nydegger

(57) ABSTRACT

Systems and methods to generate virtual spot beams are provided. The system includes a first antenna that provides a first physical spot beam that represents a radio frequency (RF) signal received from a remote source. The system also includes a second antenna that provides a second physical spot beam that represents the RF signal received from the remote source. The system further includes a beam formation module that is communicatively to the first and second antennas and that performs a beam formation operation on the first and second physical spot beams to generate one or more virtual spot beams.

33 Claims, 14 Drawing Sheets

(51) Int. Cl.
    H04B 7/04    (2017.01)
    H04B 7/204   (2006.01)
(52) U.S. Cl.
    CPC ....... H04B 7/0617 (2013.01); H04B 7/18513 (2013.01); H04B 7/2041 (2013.01)

(56) References Cited

U.S. PATENT DOCUMENTS

| | | | | |
|---|---|---|---|---|
| 6,542,536 | B1* | 4/2003 | Hershey | H04B 1/707 375/130 |
| 7,979,024 | B2 | 7/2011 | Zheng | |
| 8,107,875 | B2 | 1/2012 | Miller | |
| 2009/0252251 | A1 | 10/2009 | Tosato et al. | |
| 2010/0203884 | A1 | 8/2010 | Zheng et al. | |
| 2011/0075601 | A1* | 3/2011 | Zheng | H04B 7/086 370/316 |
| 2011/0135048 | A1* | 6/2011 | Mo | H04L 27/2657 375/359 |
| 2011/0309980 | A1 | 12/2011 | Ali et al. | |
| 2012/0093039 | A1* | 4/2012 | Rofougaran | H04J 1/00 370/278 |
| 2015/0333563 | A1* | 11/2015 | Rofougaran | H02J 1/10 713/310 |
| 2016/0087714 | A1* | 3/2016 | Sayegh | H04B 7/18513 370/316 |

OTHER PUBLICATIONS

"1,000+ Satellites to be Launched in the Decade Ahead," Euroconsult Press Release, pp. 1-3 (Nov. 9, 2012).
"Ka Sat-Europe's answer to notspots," Accessed at https://web.archive.org/web/20121230225028/http://www.toowaydirect.com/ka-sat/, Accessed on Jun. 19, 2015, pp. 1.
"Wideband Global SATCOM-Backgrounder," Boeing, pp. 1-2 (Oct. 2013).
"Xtar-System Capabilities," Accessed at https://web.archive.org/web/20121122203149/http://www.xtar.com/system.html, Accessed on Jun. 19, 2015, pp. 2.
Atayero, A.A., et al., "Satellite Link Design: A Tutorial," International Journal of Electrical & Computer Sciences IJECS-IJENS, vol. 11, No. 4, pp. 1-6 (2011).
Boudaa, A., and Bouziani, M., "Combining SFB C_O FDM Systems with SVD Assisted Multiuser Transmitter and Multi user Detector," IOSR Journal of Electronics and Communication Engineering (IOSR-JECE), vol. 6, Issue 6, pp. 24-28 (Jul.-Aug. 2013).
Carlson, B.D., "Covariance matrix estimation errors and diagonal loading in adaptive arrays," IEEE Transactions on Aerospace and Electronic Systems, vol. 24, Issue 4, pp. 397-401 (Jul. 1988).
International Search Report and Written Opinion for International Patent Application No. PCT/US14/11495 dated Sep. 19, 2014.
Jabeen, S., et al., "Performance analysis of adaptive beamforming algorithms for orthogonal frequency division multiplexing system," Proceedings of the World Congress on Engineering, vol. 1, pp. 1-5 (Jul. 2-4, 2007).
Mehmood, A., and Mohammed, A., "Characterisation and Channel Modelling for Satellite Communication Systems," Satellite Communications, Chapter 7, pp. 133-152 (Sep. 18, 2010).
Moore, T.D., Analytic Study of Space-Time and Space-Frequency Adaptive Processing for Radio Frequency Interference Suppression, Ph.D. Dissertation, Ohio State University, pp. 1-226 (2002).
Rahman, M.I., et al., "Combining Orthogonal Space-Frequency Block Coding and Spatial Multiplexing in MIMO-OFDM System," proceeding of International OFDM, pp. 1-5 (2005).
Wang, L., and Ferguson, D.,"WGS Air-Interface for AISR Missions," IEEE Military Communications Conference, pp. 1-7 (Oct. 29-31, 2007).

* cited by examiner

BEAMSPACE-FREQUENCY ADAPTIVE PROCESSING FOR SATELLITE COMMUNICATIONS

CROSS-REFERENCE TO RELATED APPLICATIONS

This Application is a U.S. National Stage filing under 35 U.S.C. § 371 of International Application No. PCT/US2014/011495, filed on Jan. 14, 2014, which in turn, under 35 U.S.C. § 119(e), is a non-provisional of, and claims priority to and the benefit of, U.S. Provisional Patent Application No. 61/752,573, filed on Jan. 15, 2013 and entitled "BEAMSPACE-FREQUENCY ADAPTIVE PROCESSING FOR SATELLITE COMMUNICATIONS," which applications are hereby expressly incorporated herein by this reference in their entireties.

TECHNICAL FIELD

The embodiments disclosed herein are related to satellite systems that generate one or more virtual spot beams from physical spot beams.

BACKGROUND

Unless otherwise indicated herein, the materials described in this section are not prior art to the claims in this application and are not admitted to be prior art by inclusion in this section.

There are various types of satellite communication systems. For example, satellite communication systems may provide a rapid and reliable communication channel for dissemination of intelligence, tasking, and coordination to a globally distributed network of end-users. These systems may be charged with providing protected communications, characterized by low probability of intercept/detection/exploitation and anti-jam capabilities in both benign and contested operational environments.

In response to a rapidly growing demand for increased bandwidth, a number of independent satellite constellations are being deployed. Wideband Global SATCOM (WGS), Advanced Extremely High Frequency (AEHF), and Mobile User Objective System (MUOS) are all expected to provide significant gains in capacity and capabilities over the next decade. Despite the deployment of these satellite systems, however, bandwidth demand for these and/or other satellite systems is expected to continue to exceed the available throughput capabilities.

SUMMARY

An illustrative embodiment disclosed herein relates to a system to generate virtual spot beams from one or more physical spot beams. The system includes a first antenna that provides a first physical spot beam that represents a radio frequency (RF) signal received from a remote source. The system also includes a second antenna that provides a second physical spot beam that represents the RF signal received from the remote source. The system further includes a beam formation module that is communicatively coupled to the first and second antennas and that performs a beam formation operation on the first and second physical spot beams to generate one or more virtual spot beams.

An illustrative embodiment disclosed herein relates to a satellite system to generate beamformed outputs from one or more input antenna signals. The system includes channel breakout modules that receive respective unique input antenna signals that represent channels of a common radio frequency (RF) signal received from a remote source. The channel breakout modules break each input antenna signal into a number of channel components. The satellite system also includes a switch module that is coupled to the channel breakout modules and receives the channel components from the channel breakout modules. The switch module then matches equivalent channel components from each of the input antenna signals. The satellite system further includes a number of beam formation modules that are coupled to the switch module and that perform a beam formation operation on the equivalent channel components to generate beamformed outputs.

An illustrative embodiment disclosed herein relates to a method to generate a number of virtual spotbeams from one or more physical spotbeams. A common radio frequency (RF) signal from a remote source is received at a number of antennas. A first physical spotbeam from a first antenna is provided to a beam formation module. A second physical spotbeam from a second antenna is provided to the beam formation module. A beam formation operation is performed by the beam formation module to generate one or more virtual spotbeams.

An illustrative embodiment disclosed herein relates to a method and computer program product to generate virtual spot beams from one or more input antenna signals. A plurality of physical input antenna signals that represent a common radio frequency (RF) signal from a remote source are received. The physical input antenna signals are divided into a number of channel components. Equivalent channel components from each input antenna signal are matched with like channel components. A beam formation operation is performed on the equivalent channel components to generate a number of virtual beam formed outputs for each channel component.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1A:
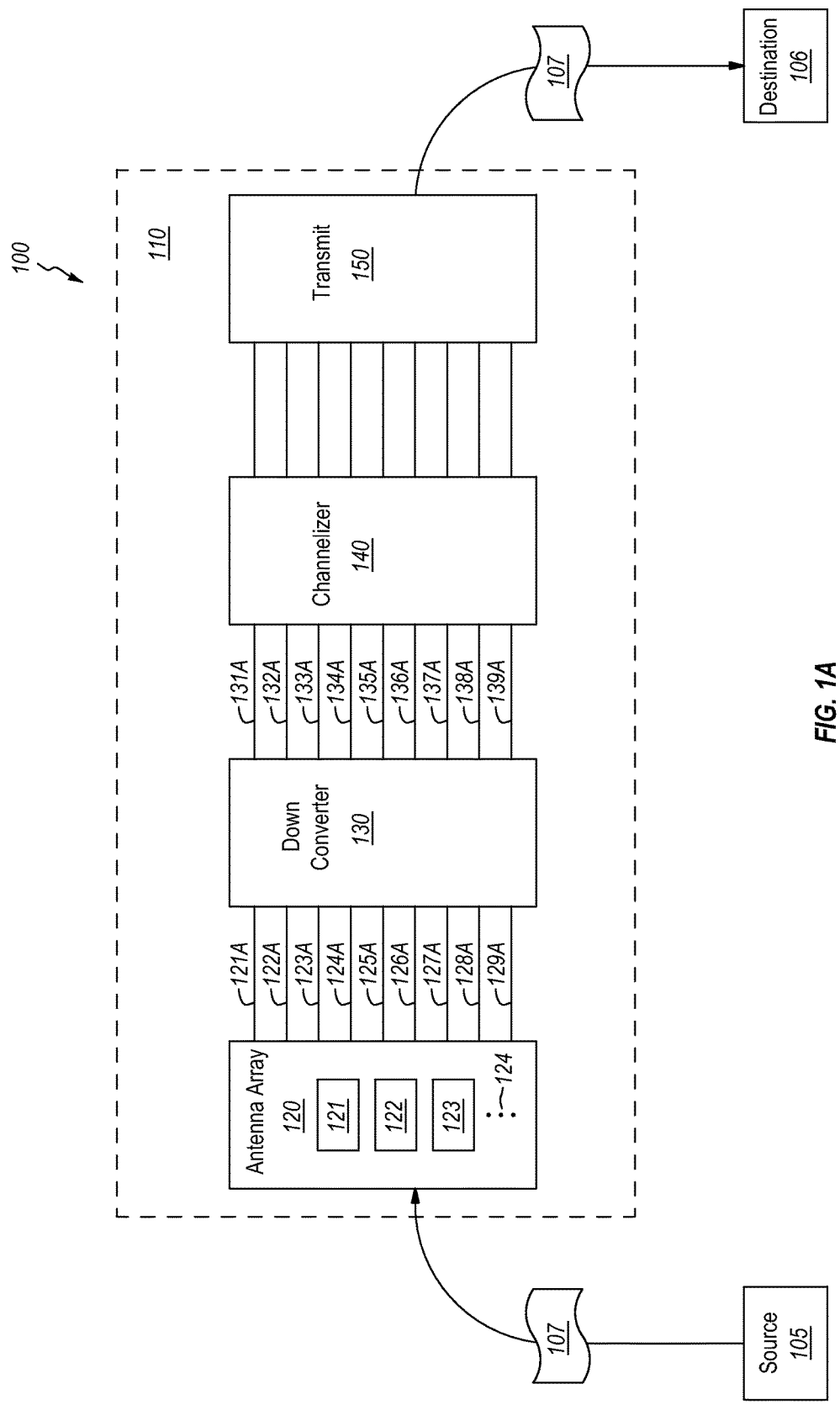
FIG. 1A is a schematic of an illustrative embodiment of a satellite system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the figures, can be arranged, substituted, combined, separated, and designed in a wide variety of different configurations, all of which are explicitly contemplated herein.

Embodiments disclosed herein relate to satellite systems and methods to generate a virtual spot beam or beamformed output. According to an embodiment, input data signals may be received by an antenna array of a satellite from a remote source. The antenna array may include various individual antennas and may be implemented as a phased array. The antenna array may provide a number of fixed, physical spot beams that may represent channels of the received input data signals. The physical spot beams may also be referred to as input antenna signals or as spatial sensitivity patterns. The spot beams may be signals that are specially concentrated in power so that they will cover only a specific geographic area on Earth.

In one embodiment, the spot beams may be down converted to digital baseband signals by a down converter module and may then be provided to a beam formation module that performs a beam formation operation on the physical spot beams to generate one or more virtual spot beams.

In one embodiment, the beam formation module may include a number of channel breakout modules that break the physical spot beams into channel components. A switch module that is coupled to the channel break out modules may match equivalent channel components from each of the physical spot beams. Each of the matched equivalent spot beams may be received by a number of beam formation operation modules that perform the beam formation operation on the equivalent channel components to generate the virtual spot beams.

In one embodiment, the beam formation operation modules may include a number of Fast Fourier Transform (FFT) modules that break each of the equivalent channel components into frequency components. The frequency components may be received by a number of frequency-specific beamformer modules that are coupled to the FFT modules and that perform the beam formation operation. An inverse Fast Fourier Transform (iFFT) module coupled to the frequency-specific beamformer modules may receive the output of the frequency-specific beamformer modules and may combine the output to generate the virtual spot beam.

FIG. 1A is a schematic illustration of an embodiment of a satellite system 100. As illustrated, the satellite system 100 may include a satellite 110. A source 105 and a destination 106 may be in communication with the satellite 110. In many embodiments, both the source 105 and the destination 106 may be located or positioned on the surface of the Earth while the satellite 110 is in orbit above the surface of the Earth. Accordingly, the source 105 and the destination 106 may be typically remote from the satellite 110. As will be explained, the source 105 may transmit a signal 107 to the satellite 110 for transmission to the destination 106.

The satellite 110 may include various elements that are used to receive, process, and then transmit the data signal 107. The embodiment of FIG. 1 may include more or less elements than those illustrated in FIG. 1. In one embodiment, the satellite 110 may illustrate part of a Wideband Global SATCOM (WGS) satellite and/or other type of satellite.

An antenna array 120 may be communicatively coupled to the source 105 and may be configured to receive the data signal 107 from the source 105. Two elements may be communicatively coupled if they are able to communicate with each other via a wired, wireless, or other communication interface. The antenna array 120 may include various individual antennas 121, 122, 123, or any number of additional individual antennas as illustrated by ellipses 124. Accordingly, the antenna array 120 may include as few as a single antenna or it may include any reasonable amount of additional antennas as circumstances warrant. In the illustrated embodiment, the antenna array 120 may include a phased array or may be any group of multiple antennas communicatively coupled to the source 105.

A down converter 130 may be communicatively coupled to the antenna array 120. The down converter 130 may receive as an input the output signals of the antenna array 120. The down converter 130 may down convert the received antenna signals from a radio frequency (RF) signal to a digital baseband signal.

A channelizer module 140 may be communicatively coupled to the down converter 130. The channelizer module 140 may divide and combine the output signals of the antenna array 120 as will be explained in further detail.

A transmit module 150 may be communicatively coupled to the channelizer module 140. The transmit module 150 may represent all the hardware and software modules that may be used to transmit the data signal 107 to the destination 106. For example, the transmit module 150 may include an up-converter and one or more transmit antennas or antenna arrays.

The operation of the satellite 110 will now be explained in further detail. The source 105 transmits the data signal 107 to the antenna array 120. The data signal 107 may be any type of data that is suitable for transmission on the satellite 110. Examples include, but are not limited to, communications signals, television signals, internet signals, navigation signals, or other types of signal(s) and combination(s) thereof. The data signal 107 is shown as a single signal for ease of illustration only. It many embodiments, the signal 107 may include multiple signals. The source 105 may represent multiple sources that each transmit different data signals 107.

The data signal 107 is received by the antenna array 120. As discussed above, the antenna array 120 may comprise several individual antennas 121, 122, 123, and 124. The antenna array 120 may include a phased array. Each of the antennas of the antenna array 120 may provide an individual physical spot beam to the down converter 130. The signal power and the phase of the received data signal 107 may vary between each spot beam in a predictable manner.

In other words, a spot beam may correspond to some specific geographic area of the Earth. Each spot beam may represent data or communication channels (herein after referred to as "channels") of the data signal 107. In addition, each channel may include various sub-channels that include channel components. The number of channel components for each channel may be determined by the bandwidth of the satellite 110. For example, for a WGS satellite having a 500 MHz X-band spectrum, the 500 MHz bandwidth may be divided into four 125 MHz channels, each with 48 2.6 MHz sub-channels.

In the illustrated embodiment, the antennas of the antenna array 120 may provide nine spot beams 121A-129A to the down converter 130. For example, the first antenna 121 may provide a first spot beam 121A, the second antenna 122 may provide a second spot beam 122A, the third antenna 123 may provide a third spot beam 123A and the antennas represented by the ellipses 124 may provide the remaining spot beams 124A-129A. The antenna array 120 may provide more or less than nine spot beams depending on the physical makeup of the antenna array.

The down converter 130 may down convert the spot beams 121A-129A from radio frequency (RF) signals to digital baseband signals 131A-139A and may then provide the digital baseband spot beam signals to the channelizer 140.

The channelizer 140 may divide the digital baseband spot beam signals 131A-139A into various sub-channels and then may direct the sub-channels onto new channels that are provided to the transmit module 150 for transmission to the destination 106. Accordingly, the channelizer 140 may act as a switchboard or router for ensuring that the data from different channels of different spot beams is provided to the correct transmit beam.

Figure 2:
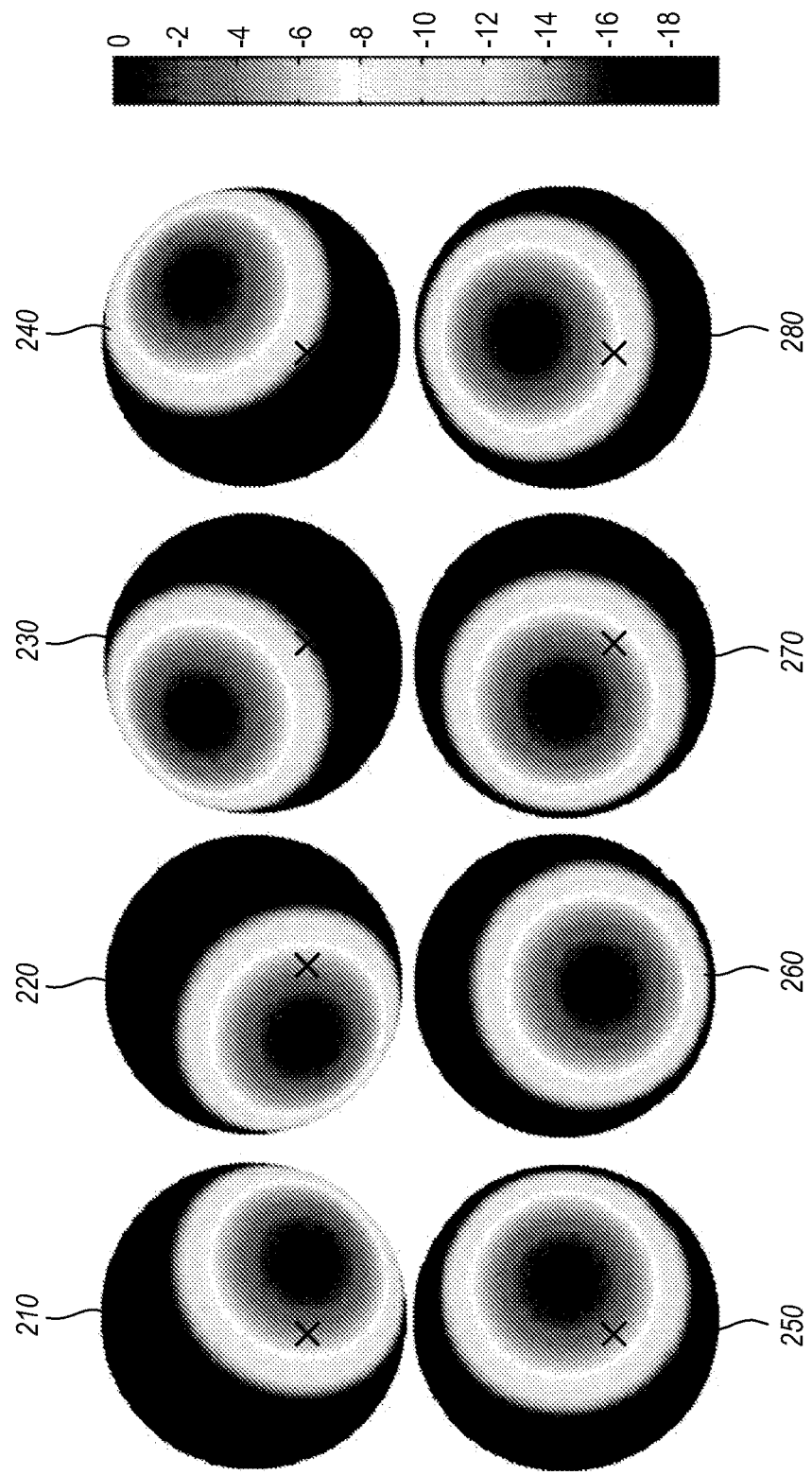
FIG. 2 is an illustration of example physical spot beams.

FIG. 2 is an illustration of example physical spot beams, and more specifically, illustrates an example of eight spot beams 210, 220, 230, 240, 250, 250, 270, and 280 that may be provided by an antenna array. The spot beams 210-280 may correspond to the spot beams 121A-129A and the antenna array may correspond to the antenna array 120 discussed previously in relation to FIG. 1A. As illustrated in FIG. 2, each spot beam 210-280 may be focused on a specific geographical area. The geographical area may be the entire surface of the Earth or it may be a smaller area. In the embodiment of FIG. 2, the area that is covered by the spot beams 210-280 may be a large geographical area of several thousand kilometers.

As illustrated in FIG. 2, each spot beam may be focused on a different portion of the geographical area. For example, a destination 106 located at a point x in the geographic area may receive a medium to strong signal from the spot beams 210 and 220, but may receive a rather weak signal from the spot beams 230 and 240. Likewise, a strong signal may be received from the spot beams 250 and 260, and a medium to strong signal may be received from the spot beams 270 and 280.

Accordingly, the spot beams 210-280 may be able to provide coverage over a large geographical area. However, as can be seen from FIG. 2, there may be a large overlap between the coverage of the spot beams 210-280, which can lead to unintended interference. In addition, since the spot beams 210-280 may cover such a large geographical area, there may be a chance for unintended interference from other signal sources that are also transmitting in the geographical area. Further, the coverage of the large geographical error may make it easier for a party to actively jam or interfere with the signal being transmitted on the spot beams 210-280.

Advantageously, the embodiments disclosed herein provide for systems and methods that generate a number of user-specific virtual spot beams or beamformed outputs from the fixed physical spot beams such as spot beams 210-280. Each of the generated virtual spot beams are capable of adapting to atmospheric, interference, and jammer conditions as needed. The embodiments disclosed herein directly address the need to increase spectral reuse, minimize or otherwise reduce payload size and weight, and mitigate interference on a channel-by-channel basis. Of course, it will be appreciated after reading this disclosure that other advantages are also contemplated by the embodiments disclosed herein.

Figure 1B:
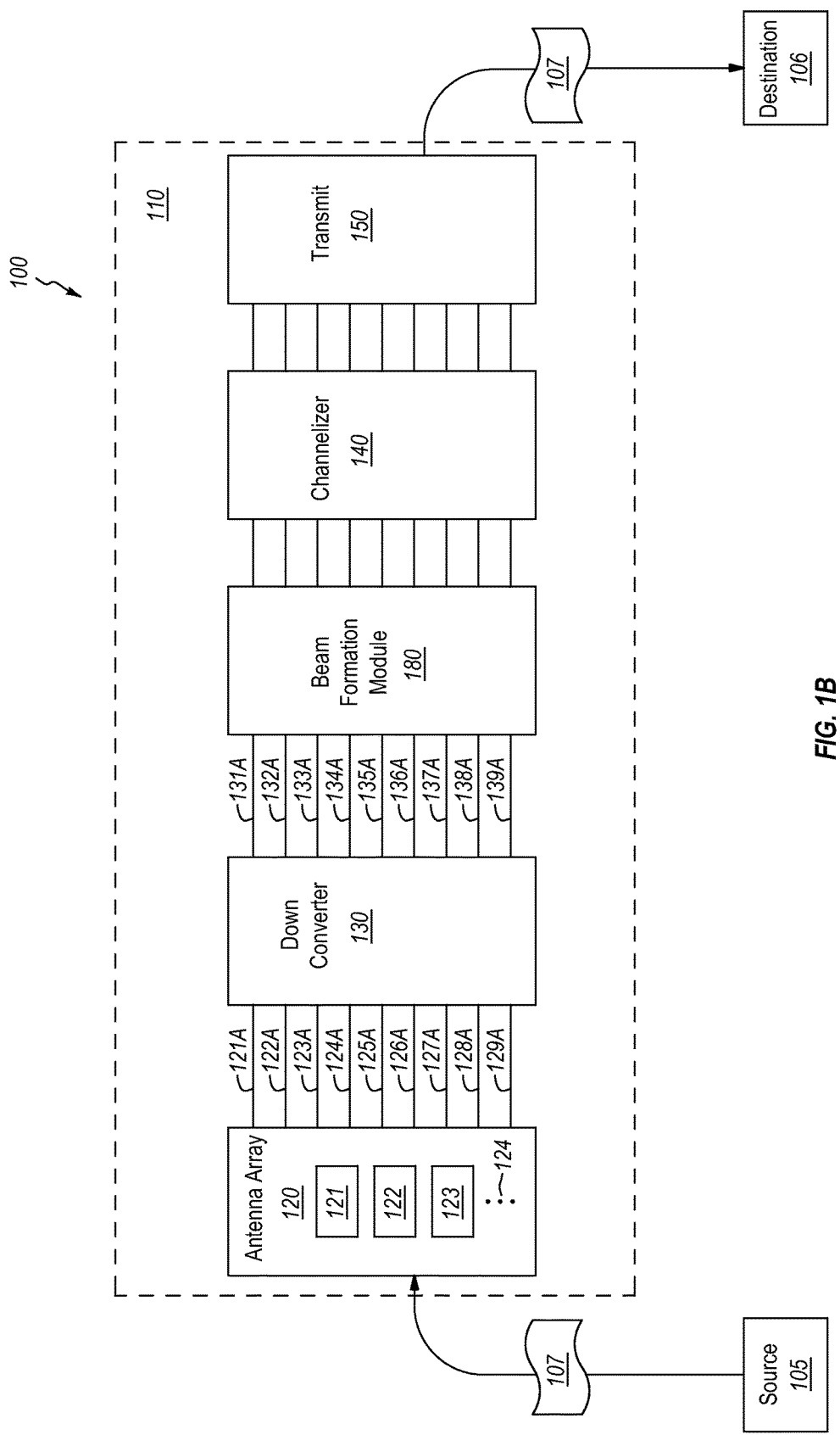
FIG. 1B is a schematic of an illustrative satellite system including a beam formation module.

FIG. 1B is a schematic of an illustrative satellite system including a beam formation module, and more specifically, is a schematic illustration of an alternative view of the satellite system 100. Accordingly, those elements previously discussed in relation to FIG. 1A may not be discussed in relation to FIG. 1B. As illustrated in FIG. 1B, the satellite 110 may include a beam formation module 180 that may be communicatively coupled to both the down converter 130 and the channelizer module 140. In one illustrative embodiment, the beam formation module 180 may be implemented as an application specific integrated circuit (ASIC), a field programmable gate array (FPGA), a microprocessor, or any computing device such as the computing device shown in FIG. 10. In other embodiments, the beam formation module 180 may be implemented as a software module or as a combination of hardware and software elements.

The beam formation module 180 may receive a first physical spot beam, also referred herein as an input antenna signal, such as spot beam 121A/131A from one of the antennas such as antenna 121 of the antenna array 120 via the down converter 130, and may receive a second physical spot beam such as spot beam 122A/132A from another of the antennas such as antenna 122 of the antenna array 120. The beam formation module 180 may also receive additional spot beams or input antenna signals from the antenna array 120 via the down converter 130 as previously described.

In some embodiments, the beam formation module 180 may be directly communicatively coupled to the antenna array 120 without the use of the down converter 130. In such embodiments, the beam formation module 180 may receive the spot beams or input antenna signals directly from the antenna array 120. Accordingly, embodiments disclosed herein may include a satellite 110 without a down converter 130.

The beam formation module 180 may perform a beam formation operation on the physical spot beams received from the antenna array 120. The beam formation operation may generate one or more virtual spot beams, also referred to herein as beamformed outputs, which are specific to an end user's needs. The generated virtual spot beams or beamformed outputs will be described in more detail to follow.

In one illustrative embodiment, the beam formation operation may include a space-frequency adaptive processing (SFAP) operation that may be performed by the beam formation module 180 in the frequency domain. In one embodiment, the beam formation operation in the frequency domain may be performed using multiple frequency-specific weighted summations that use weight coefficients that are obtained using an adaptive beaming formation operation. In an embodiment, steerage vectors may be used to compute the weight coefficients. The beam formation operation will be discussed in more detail to follow.

Figure 3:
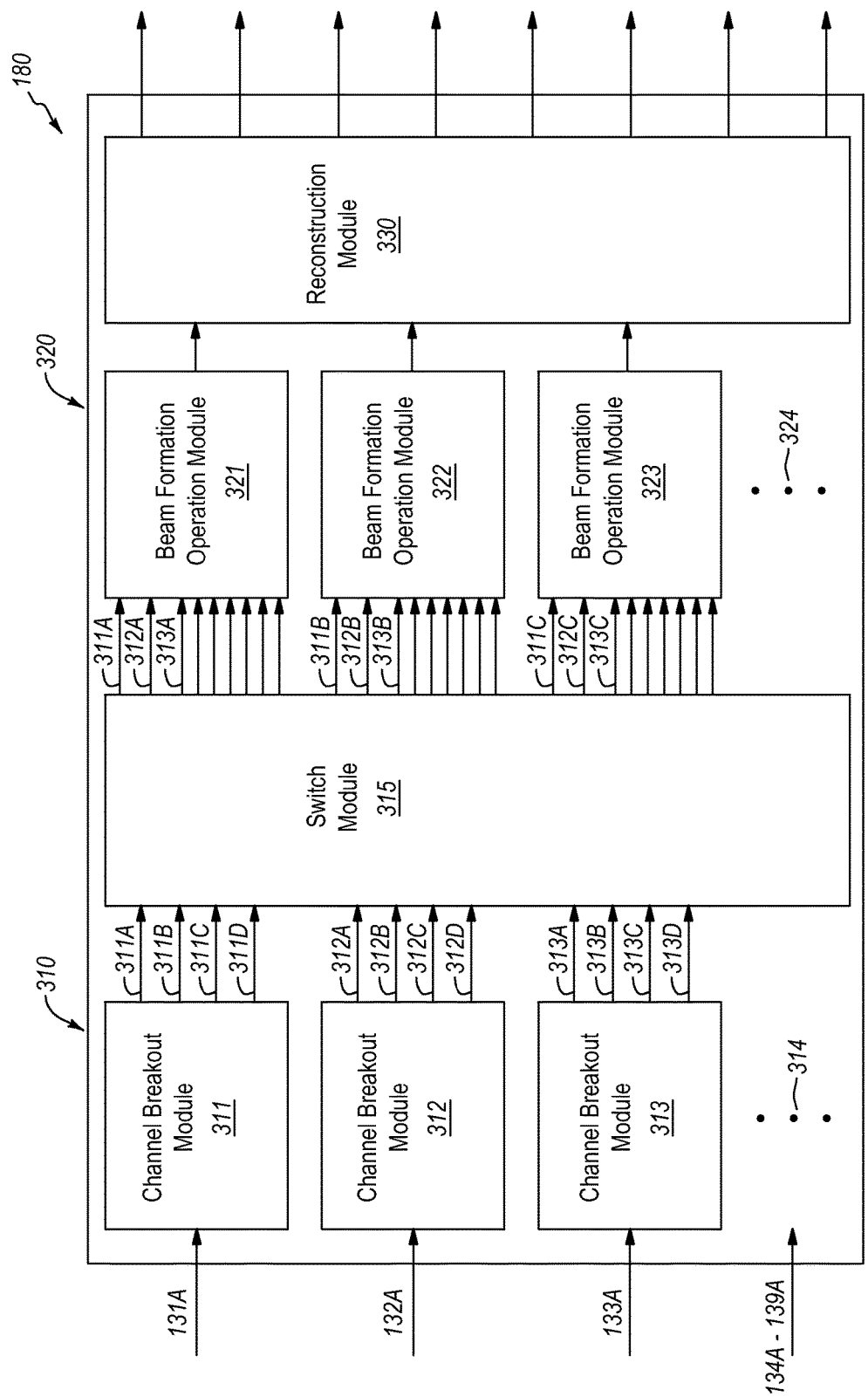
FIG. 3 is a schematic of an illustrative embodiment of a beam formation module.

FIG. 3 is a schematic of an illustrative embodiment of a beam formation module, and more specifically, is a schematic of an illustrative embodiment of the beam formation module 180 previously described. The beam formation module 180 may include more or less than the elements illustrated in FIG. 3. The various modules of the beam formation module 180 may be implemented as hardware, software (or other computer-readable instructions stored on a non-transitory computer-readable medium and executable by one or more processors), or any combination of hardware and software as circumstances warrant.

As illustrated, the beam formation module 180 may include a number of channel breakout modules 311, 312 and 313 that may be communicatively coupled to the antenna array 120, either via the down converter 130 or directly. The ellipses 314 represent that there may be any number of additional channel breakout modules (hereinafter also referred to simply as channel breakout modules 310) as circumstances warrant. For example, in a satellite 110 such as a WGS satellite having nine 500 MHz X-band spot beams provided by the antenna array 120, the beam formation module 180 may include nine channel breakout modules 310, one breakout module for each of the nine spot beams. The channel breakout modules 310 may break each of the received spot beams into channel components.

A switch module 315 may be communicatively coupled to the channel breakout modules 310. The switch module 315 may receive the channel components from the channel breakout modules 310 and may match equivalent channel components from each of the spot beams.

The beam formation module 180 may also include a number of beam formation operation modules 321, 322, and 323 that may be communicatively coupled to the switch module 315. The ellipses 324 represent that there may be any number of additional beam formation operation modules (hereinafter also referred to simply as beam formation operation modules 320) as circumstances warrant. For example, in the WGS satellite 110 having the nine 500 MHz X-band spot beams, each spot beam may be broken into four 125 MHz channels. Accordingly, the channelizer 140 may be configured to accept a total of 36 125 MZ channels. This may result in 36 individual beam formation operation modules 320 being implemented. Each of the 36 beam formation modules 320 may have nine 125 MHz channels as inputs, with each input corresponding to one of the channels. The beam formation operation modules 320 may perform a beam formation operation on each channel component of each spot beam.

The beam formation module 180 may also include a reconstruction module 330. The features and operation of the reconstruction module 330 will be described later below.

The operation of the specific embodiment of the beam formation module 180 will now be explained with reference to FIG. 3 and using the WGS satellite 110 having the nine 500 MHz X-band spot beams as an example satellite to help illustrate the operation. As illustrated, each channel break out module 310 may receive a unique spot beam or input antenna signal from the antenna array 120. For example, the channel breakout module 311 may receive the spot beam 131A from the antenna array 120 via the down converter 130, the channel breakout module 312 may receive the spot beam 132A from the antenna array 120 via the down converter 130, and the channel breakout module 313 may receive the spot beam 133A from the antenna array 120 via the down converter 130.

Each of the channel breakout modules 310 may break each of the received spot beams into a number of channel components. For example, the channel breakout module 311 may break down the spot beam 131A into channel components 311A, 311B, 311C, and 311D. Likewise, the channel breakout module 312 may break down the spot beam 132A into channel components 312A, 312B, 312C, and 312D, and the channel breakout module 313 may break down the spot beam 133A into channel components 313A, 313B, 313C, and 313D. Each of the channel breakout modules may break down a spot beam into more or less than four channel components depending on system requirements and/or other factor(s). In addition, although only channel breakout modules 311-313 are illustrated as breaking down a spot beam into channel components for ease of illustration, any of the additional channel breakout modules 314 may also break down a spot beam 134A-139A into channel components.

In the WGS satellite 110 having the nine 500 MHz X-band spot beams, each of the nine spot beams may be broken into four 125 MHz channels by the channel breakout modules 310. For example, the channel breakout module 311 may break down the spot beam 131A into a first channel component 311A that includes a channel from 0-125 MHz, a second channel component 311B that includes a channel from 126-250 MHz, a third channel component 311C that includes a channel from 251-375 MHz, and a fourth channel component 311D that includes a channel from 376-500 MHz. The remaining breakout modules 310 may break down their respective spot beams or input antenna signals in a similar manner.

The channel components 311A-311D, 312A-312D, and 313A-313D, along with all the other channel components broken down by the various channel breakout modules 310 may be received by the switch module 315. The switch module 315 may match equivalent channel components from each of the channel breakout modules 310 and may provide them to the beam formation operation modules 320. For example, the switch module 315 may match the channel components 311A, 312A, 313A along with equivalent channel components from the breakout modules 310 into a set of equivalent channel components that are each then provided to beam formation operation module 321, may match the channel components 311B, 312B, 313B along with equivalent channel components from the breakout modules 310 into a set of equivalent channel components that are then provided to beam formation operation module 322, and may match the channel components 311C, 312C, and 313C along with equivalent channel components from the breakout modules 310 into a set of equivalent channel components that are then provided to beam formation operation module 323. The remaining equivalent channel components from the various channel breakout modules 310 may also be provided to a respective beam formation operation module 320. In addition, the switch module 315 may provide the same equivalent channel components to multiple beam formation operation modules 320 for the purpose of creating multiple virtual spot beams using a single channel.

In the WGS satellite 110 having the nine 500 MHz X-band spot beams, the switch module 315 may match the first channel components 311A, 312A, and 313A that include the channel from 0-125 MHz, may match the second channel components 311B, 312B, and 313B that include the channel from 126-250 MHz, may match the third channel components 311C, 312C, and 313C that include the channel from 251-375 MHz, and may match the fourth channel components 311D, 312D, and 313D that include the channel from 376-500 MHz. The switch module 315 may then provide these channel components along with the channel components of the other six breakout modules 310 to the respective beam formation operation module 320.

The beam formation operation modules 320 may receive the sets of equivalent channel components as described and may perform a beam formation operation on the set of equivalent channel components to generate a virtual spot beam or beamformed output for the equivalent set of channel components. In one illustrative embodiment, the beam formation operation may include a space-frequency adaptive processing (SFAP) operation that may be performed by the beam formation operation module 320 in the frequency domain. In one embodiment, the beam formation operation in the frequency domain may be performed using multiple frequency-specific weighted summations that use weight coefficients that may be obtained using an adaptive beaming formation operation. In an embodiment, steerage vectors may be used to compute the weight coefficients. In an embodiment, the weight coefficients may be determined based on the received physical spot beams or input antenna signals. In an embodiment, the beam formation operation may include one of a minimum power distortionless response (MPDR) or a minimum variance distortionless response (MVDR). The beam formation operation will be discussed in more detail to follow.

Figure 4:
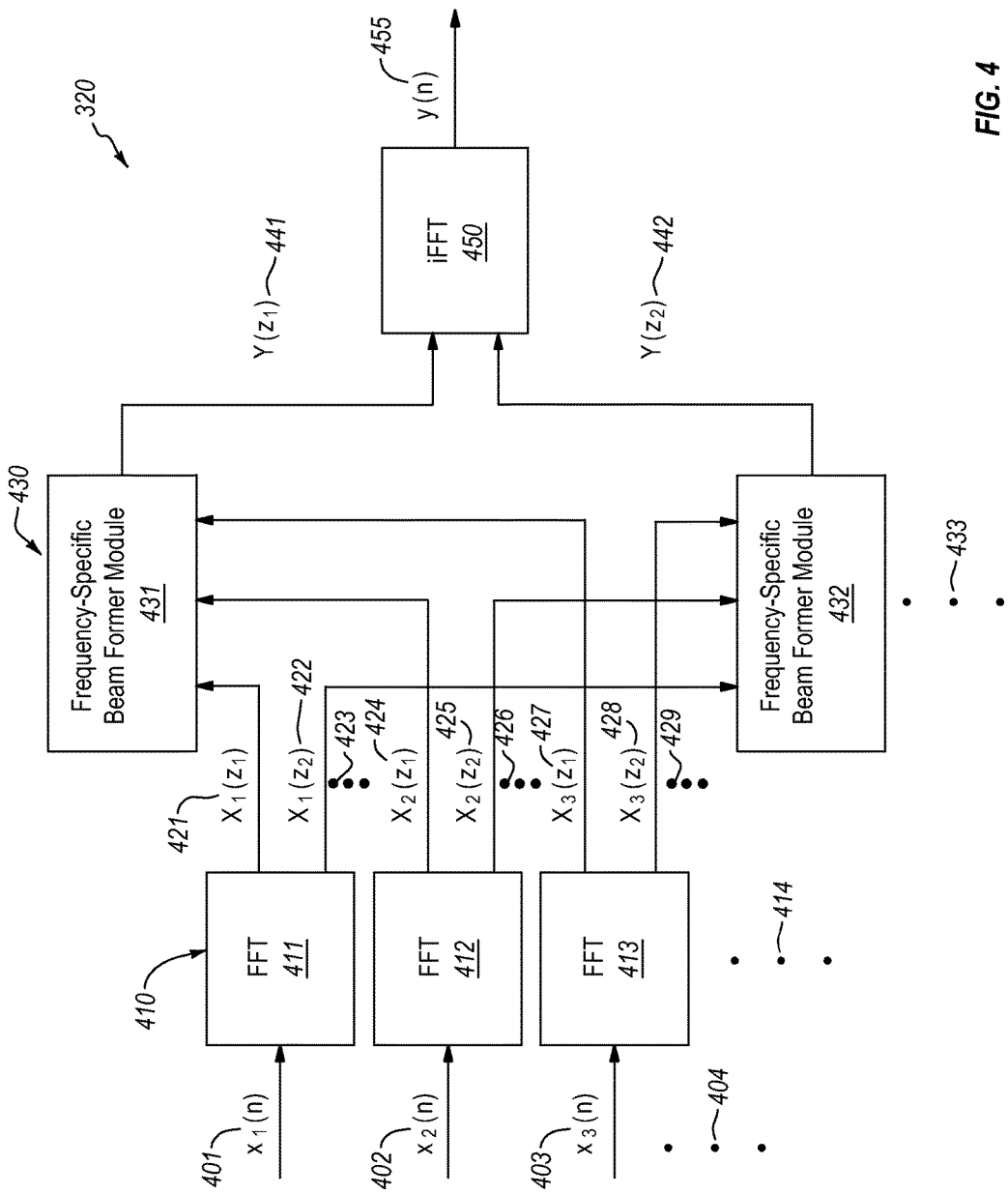
FIG. 4 is a schematic of an illustrative embodiment of a beam formation operation module.

FIG. 4 is a schematic of an illustrative embodiment of a beam formation operation module, and more specifically, the beam formation operation module 320. The beam formation operation module 320 may include more or less than the elements illustrated in FIG. 4. The various modules/components of the beam formation operation module 320 may be implemented as hardware, software, or any combination of hardware and software as circumstances warrant.

As illustrated, the beam formation operation module 320 may include a number of first modules 411, 412, and 413 that may be communicatively coupled to the switch module 315. The ellipses 414 represent that there may be any number of additional first modules as circumstances warrant. In one embodiment, the first modules 411, 412, 413, and 414 may be Fast Fourier Transform (FFT) modules. The first modules 411, 412, 413, and 414 may also be referred to hereinafter as FFT modules 410. The FFT modules 410 may break each channel component into a number of frequency components.

The FFT modules 410 may be communicatively coupled to a number of frequency specific beamformer modules 431 and 432. The ellipses 433 represent that there may be any number of additional frequency specific beamformer modules, which may also be referred to hereinafter as frequency specific beamformer modules 430. Each frequency specific beamformer module 430 may perform the beam formation operation on each of the frequency components and may output a frequency domain output.

The frequency specific beamformer modules 430 may each be communicatively coupled to a second module 450. In one embodiment, the second module 450 may be an inverse Fast Fourier Transform (iFFT) module, and so may also be referred to as iFFT module 450. The iFFT module 450 may receive the frequency domain outputs from each of the frequency specific beamformer modules 430 and may combine them into a single time domain virtual spot beam or beamformed output.

The beam formation operation will now be discussed in detail with reference to the embodiment of FIG. 4. As illustrated, the FFT modules 410 may receive the set of equivalent channel components from the switch module 415. For example, input 401 ($x_1(n)$) may represent the first channel component 311A, input 402 ($x_2(n)$) may represent the first channel component 312A, and input 403 ($x_3(n)$) may represent the first channel component 313A. The ellipses 404 represent the other channel components that may be in the set of equivalent channel components with channel components 311A, 312A, and 313A and that may be received by the additional FFT modules 414.

Once the equivalent channel components have been received, the FFT modules 410 may break each channel component into frequency components that comprise each of the channel components. For example, the FFT module 411 may break the input 401 (channel component 311A) into a first frequency component 421 ($X_1(Z_1)$), a second frequency component 422 ($X_1(Z_2)$), and any number of additional frequency components as illustrated by the ellipses 423. The FFT module 412 may break the input 402 (channel component 312A) into a first frequency component 424 ($X_2(Z_1)$), a second frequency component 425 ($X_2(Z_2)$), and any number of additional frequency components as illustrated by the ellipses 426. The FFT module 413 may break the input 403 (channel component 313A) into a first frequency component 427 ($X_3(Z_1)$), a second frequency component 428 ($X_3(Z_2)$), and any number of additional frequency components as illustrated by the ellipses 429.

In the WGS satellite 110 having the nine 500 MHz X-band spot beams, the FFT module 411 may break the input 401 (channel component 311A) into a first frequency component 421 that may be equal to a first one of the 2.6 MHz sub-channels of the 0-125 MHz channel, a second frequency component 422 that may be equal to a second 2.6 MHz sub-channel, with the ellipses 423 representing the remaining 46 sub-channels. Likewise, the FFT module 412 may break the input 402 (channel component 312A) into a first frequency component 424 that may be equal to a first one of the 2.6 MHz sub-channels, a second frequency component 425 that may be equal to a second 2.6 MHz sub-channel, with the ellipses 426 representing the remaining 46 sub-channels and the FFT module 413 may break the input 403 (channel component 313A) into a first frequency component 427 that may be equal to a first one of the 2.6 MHz sub-channels, a second frequency component 428 that may be equal to a second 2.6 MHz sub-channel, with the ellipses 429 representing the remaining 46 sub-channels. In some embodiments, the frequency components may include increments other than the 2.5 MHz sub-channels. For instance in one embodiment, the FFT modules 410 may be FFT modules that break the 125 MHz channels into 100 kHz blocks. Accordingly, the embodiments disclosed herein are not limited by the size of the frequency components generated by the FFT modules 410.

Each of the frequency components from each of the FFT modules 410 may be received by a unique frequency-specific beamformer module 430. For example, the first frequency components 421, 424, and 427 are received by the frequency-specific beamformer module 431 and the second frequency components 422, 425, and 428 are received by the frequency-specific beamformer module 432. The remaining frequency components 423, 426, and 429 are received by corresponding frequency-specific beamformer modules 433.

The frequency-specific beamformer modules 430 may then perform the beam formation operation on each of the received frequency components. In one embodiment, the beam formation operation may include one of a minimum power distortionless response (MPDR) or a minimum variance distortionless response (MVDR). MPDR and MVDR are two names for the same beam formation algorithm and so only MPDR is used in describing the embodiments disclosed herein. Other beam formation algorithms may also be implemented.

The frequency-specific beamformer modules 430 may each output a single frequency domain output that is capable of adaptively compensating for interference and jamming as will be explained in more detail to follow. For example, the frequency-specific beamformer module 431 may output a single frequency domain output 441 ($Y(Z_1)$), the frequency-specific beamformer module 432 may output a single frequency domain output 442 ($Y(Z_2)$), and the frequency-specific beamformer modules 433 may also provide a single frequency domain output. In the WGS satellite 110 having the nine 500 MHz X-band spot beams, up to 1728 frequency domain outputs may be available as outputs to the frequency-specific beamformer modules 430. The 1728 figure may be based on each of the 36 beam formation modules 320 performing the beam formation operation on the 48 sub-channels of each of the 125 MHz channels as previously described.

An embodiment of the beam formation operation will now be explained. The embodiment illustrated in FIG. 4 shows an example of an architecture suitable to perform a space-frequency adaptive processing (SFAP) operation using a MPDR beam forming process.

In the embodiment, the beam formation operation performed by the frequency-specific beam former modules 430 may use a weighted summation of frequency domain values from each antenna to produce a single frequency domain value, such as outputs 441 and 442:

$$Y_i(z) = \Sigma w^*_j X_{ij}(z) = w^H X_i(z), \quad (1)$$

where $w_j$ is a weighting coefficient; the '*' superscript indicates a complex conjugate; $X_{ij}(z)$ is the frequency domain value corresponding to the ith FFT in time and jth antenna input; w is a column vector of $w_j$ weights; 'H' depicts a conjugate transpose operation; and $X_i(z)$ is a column vector of frequency domain $X_{ij}(z)$ values corresponding to the ith FFT in time.

The MPDR algorithm may select the weighting coefficients w to satisfy the following equation:

$$w = \min_w w^H R_x(z) w \text{ such that } w^H e(z) = 1, \quad (2)$$

where e(z) is a unit-norm column vector, referred to as a steerage vector, that describes an anticipated relationship between $X_i(z)$ elements, and $R_x(z)$ is an auto-correlation matrix computed as $$R_x(z) = \Sigma_i X_i(z) X_i^H(z), \quad (3)$$

The solution to the above constrained minimization problem can be obtained through the use of a Lagrange multiplier. In one embodiment, a closed-form solution for the optimal weights is:

$$w = R_x^{-1}(z) e(z) / [e^H(z) R_x^{-1}(z) e(z)] \quad (4)$$

The '−1' superscript denotes a matrix inverse, meaning that $R_x^{-1}(z) R_x(z) = R_x(z) R_x^{-1}(z) = I$, where I is the identity matrix. Because the auto-correlation matrix, $R_x(z)$, is computed using experimental data, the matrix inverse, $R_x^{-1}(z)$, shown in the above equation (4) can be numerically unstable, e.g. if the autocorrelation matrix is singular, therefore some type of regularization such as diagonal loading may be employed.

In the above equations, the anticipated relationship between $X_i(z)$ elements, expressed by e(z), can be determined using an anticipated phase and amplitude relationships of each input spot beam. In other words, the MPDR algorithm may take each frequency component of the spot beams, for example frequency components 421-429, and may subject each to a weighted summation using the weight coefficients w. The algorithm further may select the weight coefficients w to ensure that each of the frequency components 421-429 satisfy the anticipated phase and amplitude relationship for each frequency component. In particular, the left hand side of equation (2) may minimize the power of each of the frequency components. The right hand side of the equation may act as a constraint on the power minimization by ensuring that if the signal energy of a frequency component does not have the anticipated phase and amplitude relationship, then that frequency component may be minimized; and if the signal energy of the frequency component does have anticipated relationship, that frequency component may not be minimized. Minimizing the frequency components that are not anticipated may be a form of filtering signal components from the frequency components.

Accordingly, if one of the frequency components 421-429 shows signal energy that is larger than anticipated or otherwise shows unanticipated characteristics, this frequency component may be minimized by the beam formation operation. Advantageously, this may substantially remove any jamming signals and any unintended interference signals as these signals may not have the anticipated amplitude and phase. In some embodiments, any frequency components that are part of a spot beam focused on a geographical area that is not of interest may also be minimized.

Figure 6A:
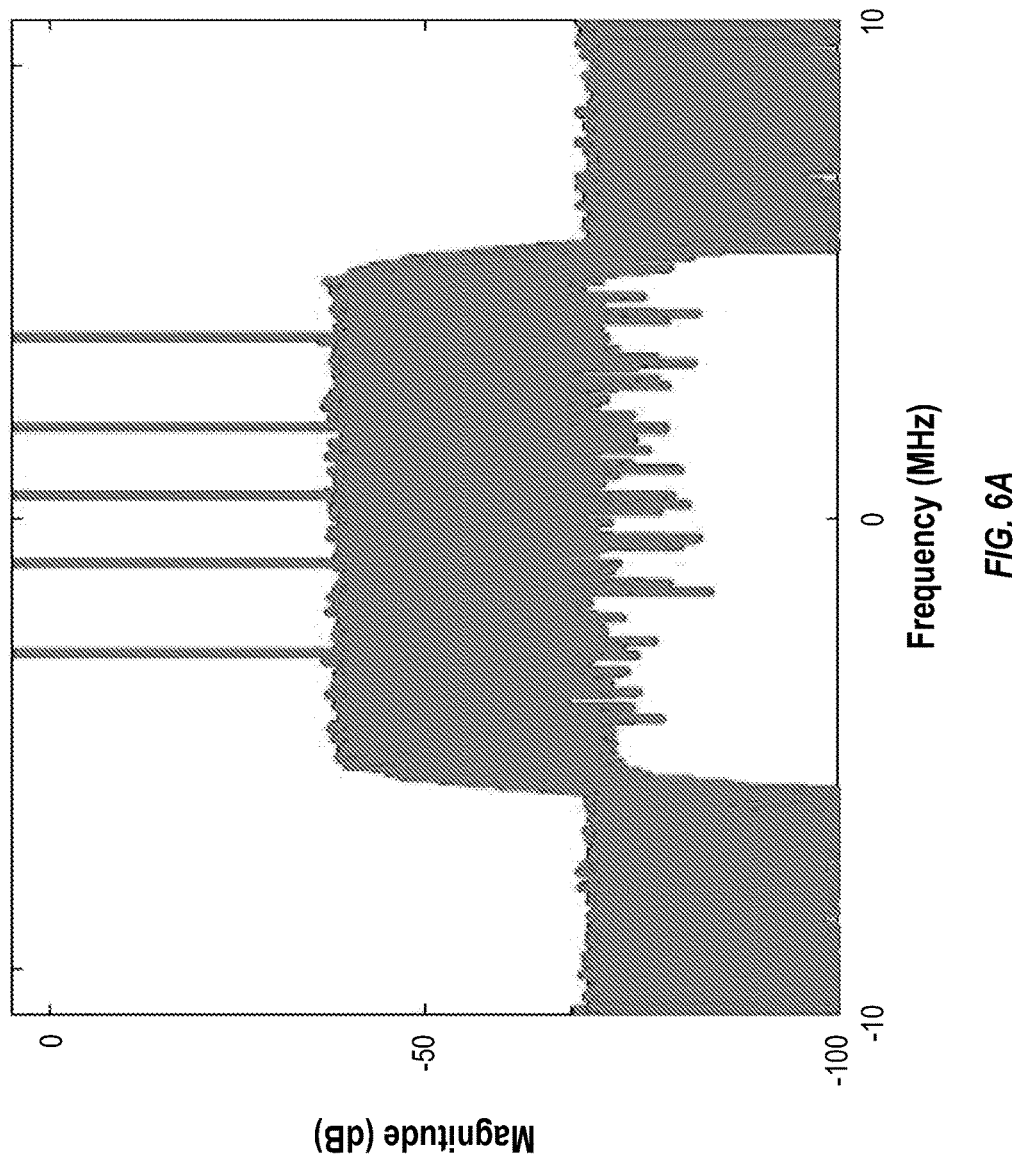
FIGS. 6A-6D illustrate an example of the adaptive output achieved by combined space-frequency adaptive processing (SFAP) and minimum power distortionless response (MPDR) operations.
Figure 6B:
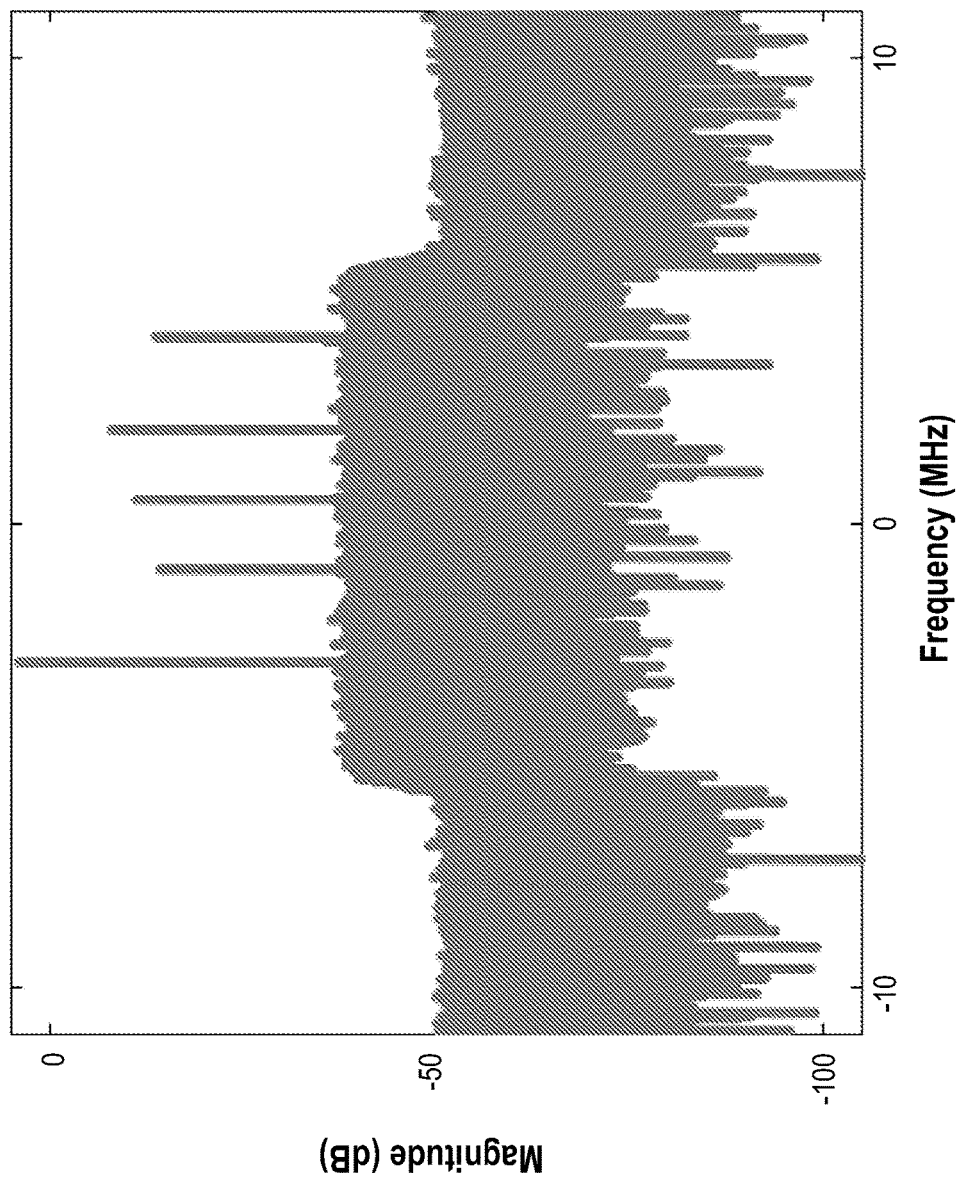
Figure 6C:
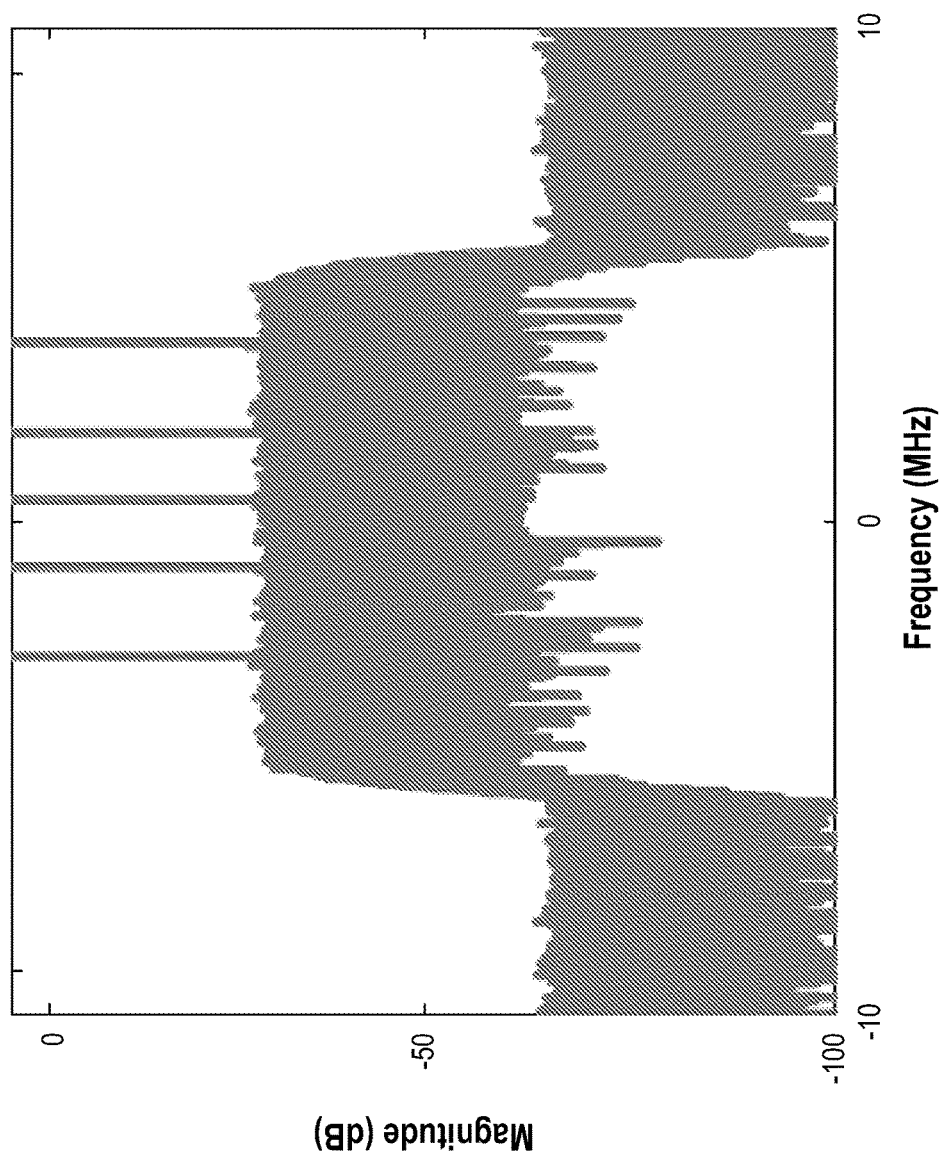
Figure 6D:
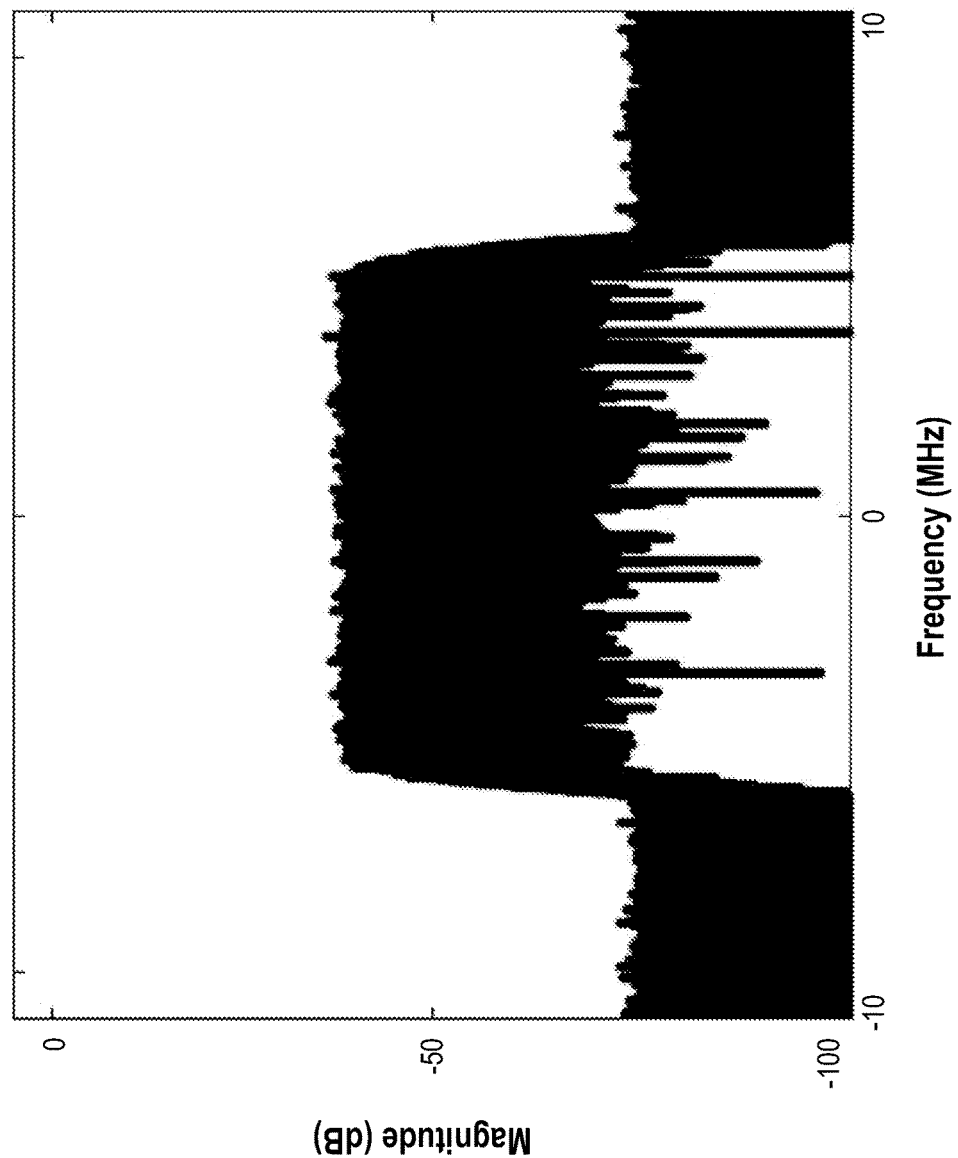

FIGS. 6A-6D illustrate an example of the adaptive output achieved by combined space-frequency adaptive processing (SFAP) and minimum power distortionless response (MPDR) operations, and more specifically, illustrate an example of the adaptive, frequency-dependent nulling achieved by the combined SFAP and MPDR operations used by some of the embodiments disclosed herein to perform the beam formation operation. For this example, three sensors were used to record a 10 MHz signal in the presence of five uncorrelated, continuous-wave jammers originating from five locations other than the desired 10 MHz signal with a total signal to interference plus noise ratio (SINR) of −17 dB, as is illustrated in FIG. 6A. For each case, the direction of the desired 10 MHz signal is known, but no information about the number, strength, or direction of interferers is available. From FIG. 6B, one can see that MPDR alone is unable to compensate for the interferers because there is an insufficient number of degrees of freedom (three degrees of freedom vs. six signals), which results in a SINR of −5 dB. From FIG. 6C, it can be seen that SFAP alone similarly produces poor results, in this case a SINR of −16 dB, because the interferers are not adaptively nulled. The combination of SFAP with MPDR illustrated in FIG. 6D, however, produces a substantially improved output with an SINR of 26 dB. The performance gain may be largely due to the fact that each of the interferers is adaptively nulled in their respective frequency bin. In other words, each frequency bin may have all three degrees of freedom available to adaptively null interferers and since each frequency bin may contain at most two signals (the desired signal plus an interferer), there may be sufficient degrees of freedom available to null the narrowband interferers.

Returning to FIG. 4, as discussed previously, the frequency-specific beamformer modules 430 may output a single frequency domain output that has had any jamming and/or interference signals removed. These outputs, such as outputs 441 and 442, may be received by the iFFT module 450. The iFFT module 450 may combine all of the frequency domain outputs into a single time domain virtual spot beam or beamformed output 455.

Figure 5:
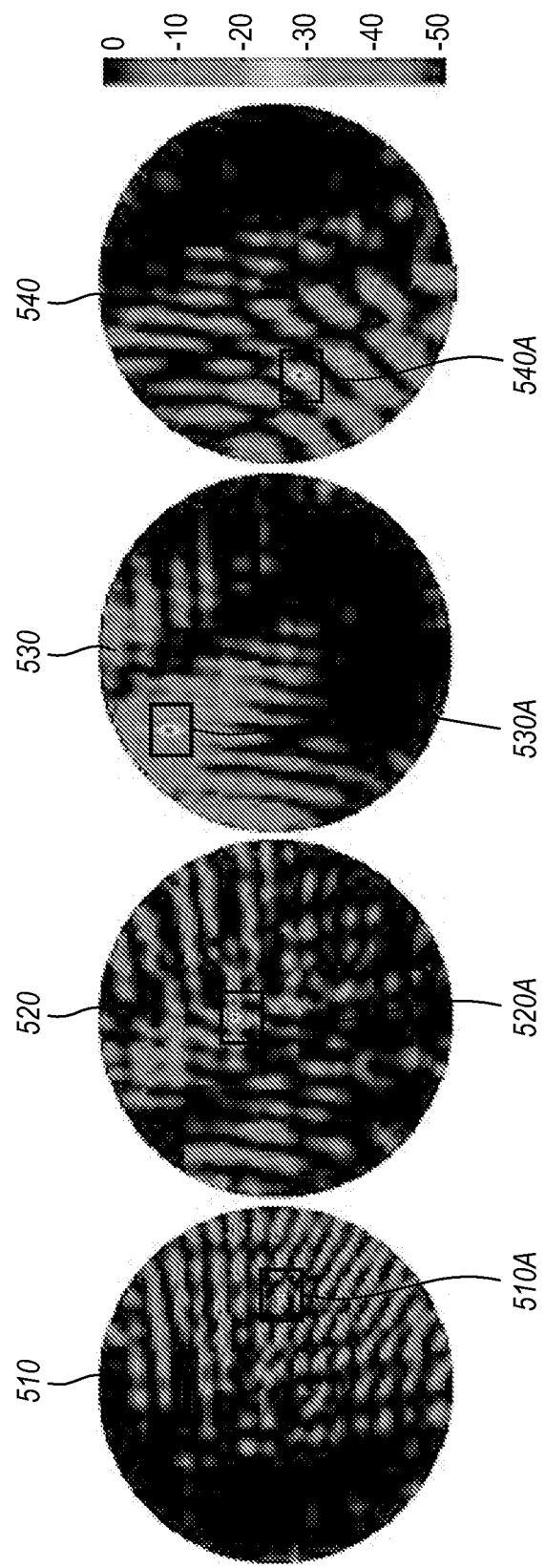
FIG. 5 is an illustration of example virtual spot beams.

FIG. 5 is an illustration of example virtual spot beams, and more specifically, illustrates some examples of the virtual spot beams such as virtual spot beam 455 generated as the output of the iFFT modules 450. FIG. 5 shows four different virtual spot beams 510, 520, 530, and 540 that have been generated by the process previously described. As illustrated, each of the spot beams may be focused on a very small geographical area that is only about 500 kilometers in size, for instance. For example, virtual spot beam 510 may be focused on the area denoted by box 510A, virtual spot beam 520 may be focused on the area denoted by box 520A, virtual spot beam 530 may be focused on the area denoted by box 530A, and virtual spot beam 540 may be focused on the area denoted by box 540A. Because each virtual spot beam may be focused on such a small area, there may be very little chance that any unintended interference will occur and it may be very difficult for any jamming to occur.

Returning to FIG. 3, it is illustrated that in some embodiments, the beam formation module 180 may include a reconstruction module 330, which may be communicatively coupled to the beam formation operation modules 320 and to the channelizer 140. The reconstruction module 330 may receive the virtual spot beams, such as virtual spot beam 455, from each of the beam formation operation modules 320. The reconstruction module 330 may then transform or place the virtual spot beams into a format that is expected by the channelizer 140 or some other element of the satellite 110 so that the virtual spot beams can be provided to the transmit module 150 for transmission. For example, in the WGS example satellite, the reconstruction module 330 may recreate each of the virtual spot beams into nine 500 MHz beams having the four 125 MHz channels since this is the format the channelizer 140 would expect.

Figure 7:
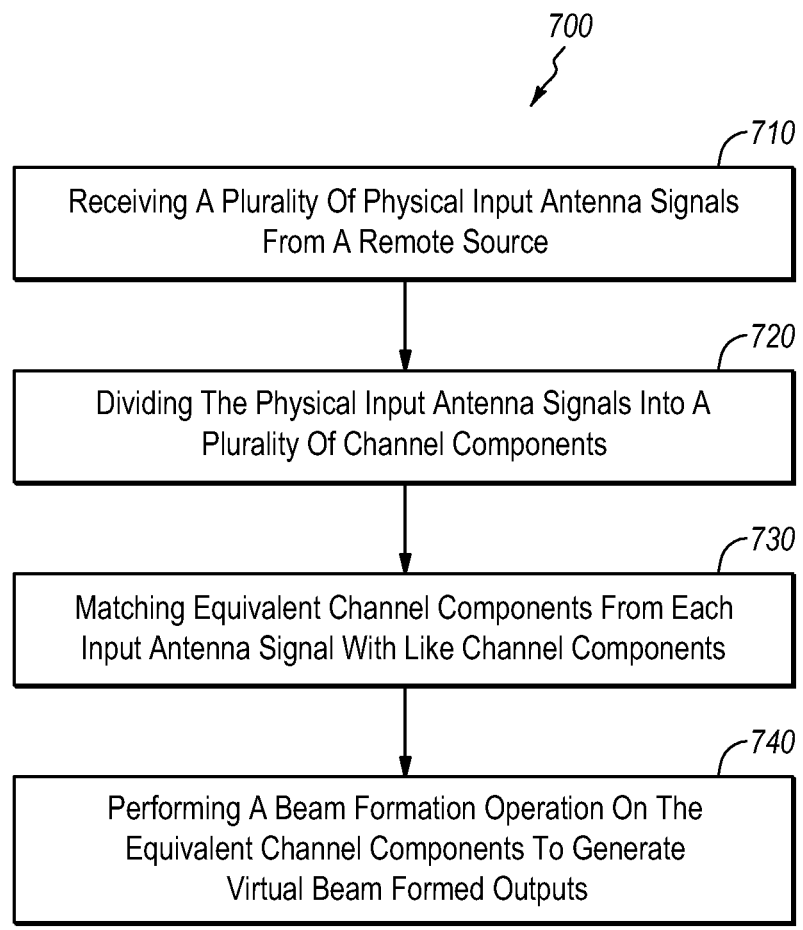
FIG. 7 is a flow diagram of an embodiment of a method to generate a plurality of virtual outputs from one or more input antenna signals.

FIG. 7 is a flow diagram of an illustrative embodiment of a method 700 to generate a plurality of virtual outputs from one or more input antenna signals. The method 700, and other methods and processes described herein, set forth various blocks or actions that may be described as processes, functional operations, events and/or acts, etc., which may be performed by hardware, software, firmware, and/or combination thereof. The method 700 may include one or more operations as illustrated by blocks 710, 720, 730, and 740. In block 710 ("Receiving a Plurality of Physical Input Antenna Signals from a Remote Source"), a plurality of physical input antenna signals that represent a common radio frequency (RF) signal from a remote source may be received. For example, in one illustrative embodiment, the beam formation module 180 may receive the spot beams 121A-129A from the antenna array 120. In some embodiments, the spot beams 121A-129A may be down converted to digital baseband spot beams 131A-139A prior to being received by the beam formation module 180. The spot beams may represent the data signal 107 received from the remote source 105.

In block 720 ("Dividing the Physical Input Antenna Signals Into a Plurality of Channels"), the received physical input antenna signals may be divided into channel components. For example, the received spot beams 121A-129A or 131A-139A may be divided by the channel breakout module 311 into channel components 311A, 311B, 311C, 311D, by the channel breakout module 312 into channel components 312A, 312B, 312C, 312D, and by the channel break out module 313 into channel components 313A, 313B, 313C, 313D. In one embodiment, the channel components may correspond to four 125 MHz channels.

In block 730 ("Matching Equivalent Channel Components Form Each Input Antenna Signal With Like Channel Components"), equivalent channel components from each input antenna signal may be matched. For example, the switch module 315 may match equivalent channel components from the spot beams 121A-129A or 131A-139A. In one embodiment, the switch module 315 may match channel components 311A, 312A, and 313A into a first set of equivalent channel components, channel components 311B, 312B, and 313B into a second set of equivalent channel components, channel components 311C, 312C, and 313C into a third set of equivalent channel components, and channel components 311D, 312D, and 313D into a set of fourth equivalent channel components. In one embodiment, the matched channel components may correspond to sub-channels of the four 125 MHz channels.

In block 740 ("Performing a Beam Formation Operation on the Equivalent Channel Components to Generate Virtual Beam Formed Outputs"), a beam formation operation may be performed on the equivalent channel components to generate virtual beam formed outputs for each channel component. For example, the beam formation operation module 321 may perform a beam formation operation on equivalent channel components 311A, 312A, and 313A, the beam formation operation module 322 may perform a beam formation operation on equivalent channel components 311B, 312B, and 313B, the beam formation operation module 323 may perform a beam formation operation on equivalent channel components 311C, 312C, and 313C, and the beam formation operation module 324 may perform a beam formation operation on equivalent channel components 311D, 312D, and 313D.

In one illustrative embodiment, the beam formation operation may include a space-frequency adaptive processing (SFAP) operation that may be performed by the beam formation operation modules 320 in the frequency domain. In one embodiment, the beam formation operation in the frequency domain may be performed using multiple frequency-specific weighted summations that use weight coefficients that may be obtained using an adaptive beaming formation operation. In an embodiment, steerage vectors may be used to compute the weight coefficients. In an embodiment, the beam formation operation may include one of a minimum power distortionless response or a minimum variance distortionless response. The beam formation operation may generate a virtual beam formed output or spot beam, such as virtual spot beam 455.

Figure 8:
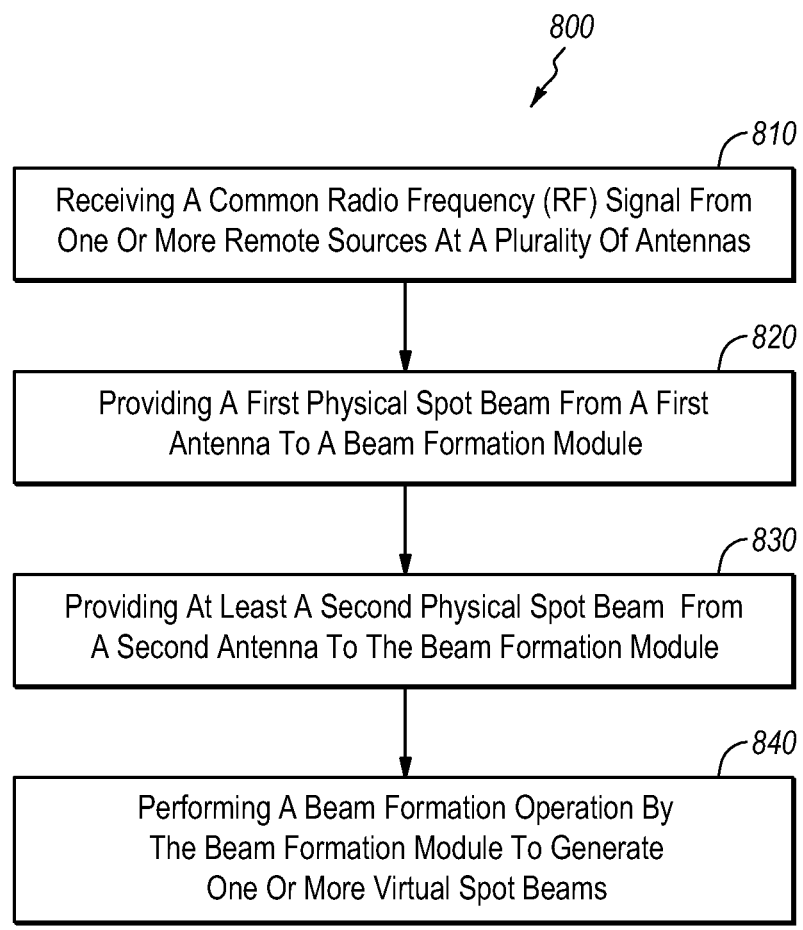
FIG. 8 is a flow diagram of an embodiment of a method to generate a plurality of virtual spot beams from one or more physical spot beams.

FIG. 8 is a flow diagram of an illustrative embodiment of a method 800 to generate a plurality of virtual spot beams from one or more physical spot beams. The method 800 may include one or more operations as illustrated by blocks 810, 820, 830, and 840. In block 810 ("Receiving a Common Radio Frequency (RF) Signal From a Remote Source at a Plurality of Antennas"), a common radio frequency (RF) signal from a remote source may be received at a plurality of antennas. For example, in one illustrative embodiment, the data signal 107 may be received from the remote source 105 by the antenna array 120.

In block 820 ("Providing a First Physical Spot Beam From a First Antenna To a Beam Formation Module"), a first physical spot beam from a first antenna and representing the common RF signal may be provided to a beam formation module. For example, the antenna 121 of the antenna array 120 may provide a first physical spot beam 121A/131A to the beam formation module 180. The physical spot beam 121A/131A may represent the data signal 107.

In block 830 ("Providing at Least a Second Physical Spot Beam From a Second Antenna to the Beam Formation Module"), at least a second physical spot beam from a second antenna and representing the common RF signal may be provided to the beam formation module. For example, the antenna 122 of the antenna array 120 may provide a second physical spot beam 122A/132A to the beam formation module 180. The physical spot beam 122A/132A may represent the data signal 107.

In block 840 ("Performing a Beam Formation Operation by the Beam Formation Module to Generate One or More Virtual Spot Beams"), a beam formation operation may be performed by the beam formation module to generate one or more virtual spot beams. For example, beam formation module 180 may perform a beam formation operation to generate the virtual spot beam 455 as previously described. In one embodiment, the beam formation operation modules 320 may include the embodiments discussed previously in relation to FIGS. 3 and 4. In one embodiment, the beam formation operation may include a space-frequency adaptive processing operation that is performed by the beam formation operation modules 320 in the frequency domain. In one embodiment, the beam formation operation in the frequency domain may be performed using multiple frequency-specific weighted summations that use weight coefficients that may be obtained using an adaptive beaming formation operation. In an embodiment, steerage vectors may be used to compute the weight coefficients. In an embodiment, the beam formation operation may include one of a minimum power distortionless response or a minimum variance distortionless response.

Figure 9:
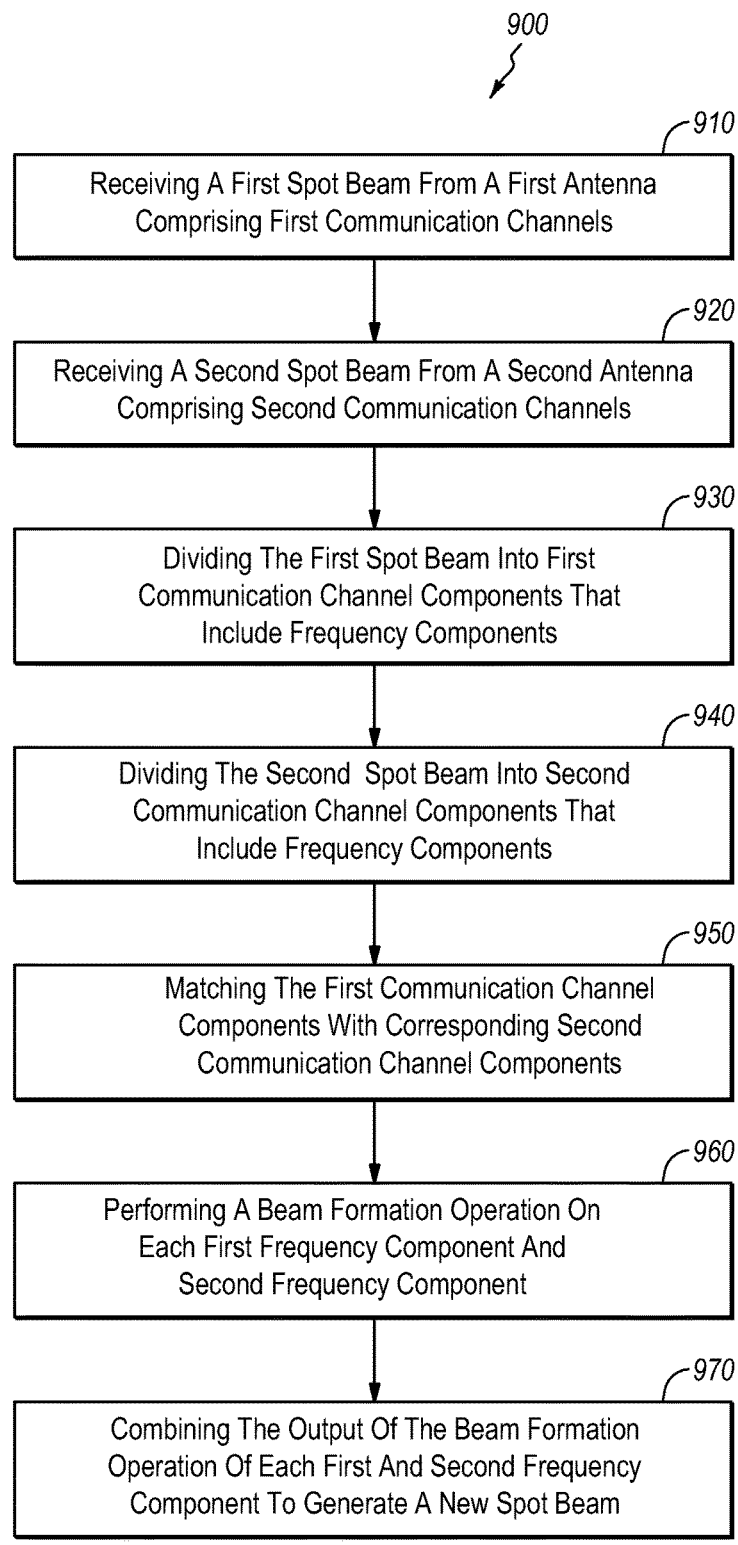
FIG. 9 is a flow diagram of an embodiment of a method to generate a new spot beam

FIG. 9 is a flow diagram of an illustrative embodiment of a method 900 to generate a new spot beam. The method 900 may include one or more operations as illustrated by blocks 910, 920, 930, 940, 950, 960, and 970. In block 910 ("Receiving A First Spot Beam From a First Antenna Comprising First Communication Channels"), a first spot beam from a first antenna may be received. The first spot beam may comprise first communication channels that communicate data from a remote source. For example, the beam formation module 180 may receive a first spot beam 121A/131A from the first antenna 121 of the antenna array 120. The first spot beam 121A/131A may represent first communication channels of data signal 107 received from the remote source 105.

In block 920 ("Receiving a Second Spot Beam From a Second Antenna Comprising Second Communication Channels"), a second spot beam from a second antenna may be received. The second spot beam may comprise second communication channels that communicate data from a remote source. For example, the beam formation module 180 may receive a second spot beam 122A/132A from the second antenna 122 of the antenna array 120. The second spot beam 122A/132A may represent second communication channels of data signal 107 received from the remote source 105.

In block 930 ("Dividing the First Spot Beam Into First Communication Channel Components That Include Frequency Components"), the first spot beam may be divided into first communication channel components. Each of the first channel components may comprise or may be changeable into first frequency components. For example, the channel breakout module 311 may divide the first spotbeam 121A/131A into channels components 311A, 311B, 311C, 311D. The channel components 311A, 311B, 311C, 311D may be changed into frequency components by the FFT modules 410 as previously described.

In block 940 ("Dividing the Second Spot Beam Into Second Communication Channel Components That Include Frequency Components"), the second spot beam may be divided into second communication channel components. Each of the second channel components may comprise or may be changeable into second frequency components. For example, the channel breakout module 312 may divide the second spotbeam 122A/132A into channels components 312A, 312B, 312C, 312D. The channel components 312A, 312B, 312C, 312D may be changed into frequency components by the FFT modules 410 as previously described.

In block 950 ("Matching the First Communication Channel Components With Corresponding Second Communication Channel Components"), corresponding first and second communication channel components may be matched. For example, the switch module 315 may match equivalent channel components from the first spot beam 121A/131A, second spot beam 122A/132A, and the remaining spot beams. In one embodiment, the switch module 315 may match channel components 311A, 312A, and 313A into a first set of equivalent channel components, channel components 311B, 312B, and 313B into a second set of equivalent channel components, channel components 311C, 312C, and 313C into a third set of equivalent channel components, and channel components 311D, 312D, and 313D into a set of fourth equivalent channel components.

In block 960 ("Performing a Beam Formation Operation on Each First Frequency Component and Second Frequency Component"), a beam formation operation on each first frequency component and each second frequency component of each corresponding matched first and second communication channel may be performed. For example, the first FFT module 411 may convert the communication channel components 311A into first and second frequency components 421 and 422. The second FFT module 412 may convert the communication channel components 312A into first and second frequency components 424 and 425. The frequency-specific beam former module 431 may perform a beam formation operation on the first frequency components 421 and 424. The frequency-specific beam former module 432 may perform a beam formation operation on the second frequency components 422 and 425.

In block 970 "(Combing the Output of the Beam Formation Operation of Each First and Second Frequency Component to Generate a New Spot Beam"), the output of the beam formation operation of each first and second frequency component may be combined to a new spot beam that may include one or more signal channels and may be substantially more focused than the first or second spot beams. For example, the output 441 of the frequency-specific beam former module 431 may be combined with the output 442 of the frequency-specific beam former module 432 to generate the new virtual spot beam 455. As illustrated in FIGS. 2 and 5, the new virtual spot beam 455 may be more focused on its target than the first and second spot beams.

For this and other processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

Figure 10:
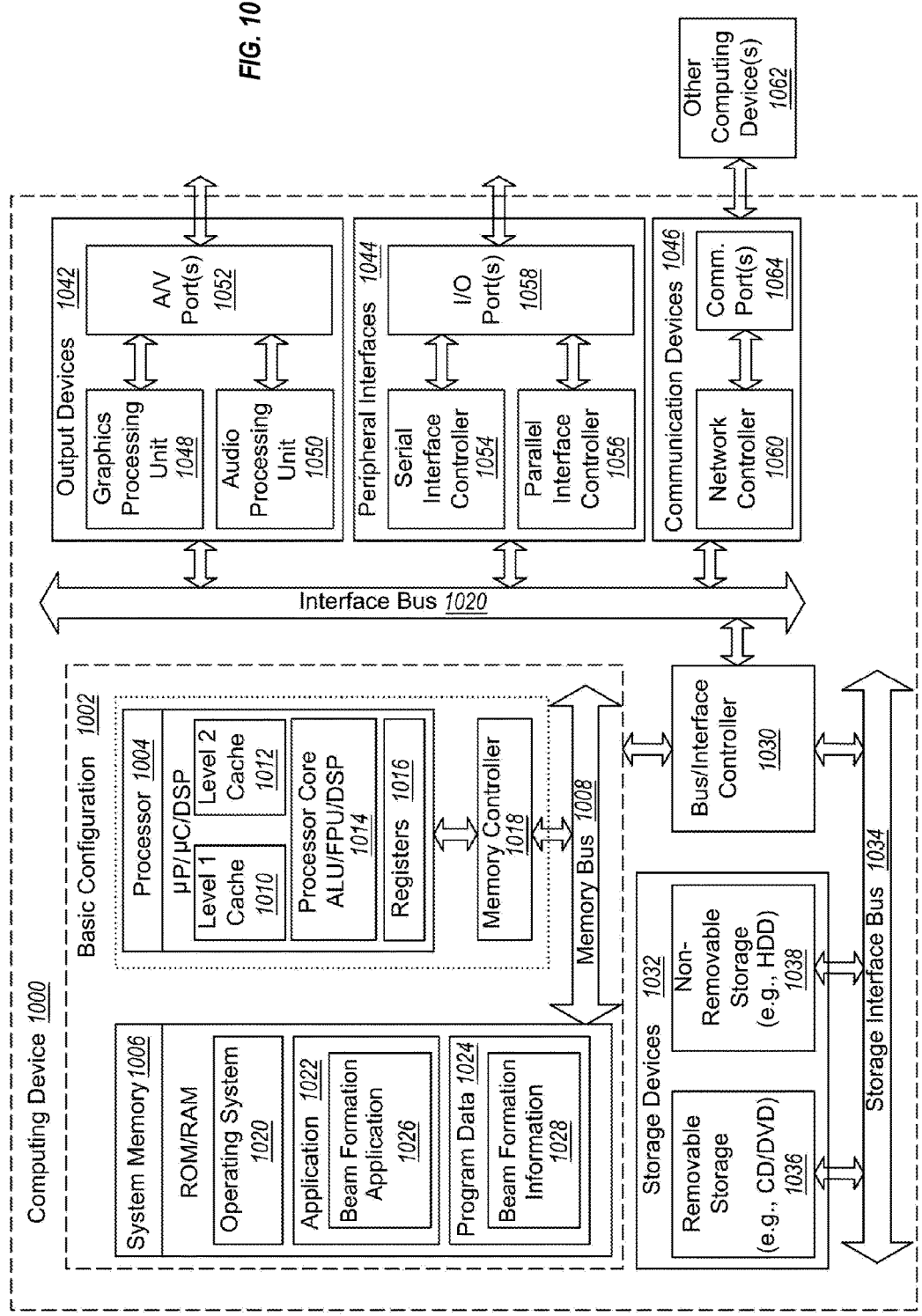
FIG. 10 shows an example computing device that is for generating a virtual spot beam in accordance with the present disclosure.

FIG. 10 shows an example computing device 1000 that is arranged for generating virtual spot beams in accordance with the present disclosure. In a very basic configuration 1002, computing device 1000 generally includes one or more processors 1004 and a system memory 1006. A memory bus 1008 may be used for communicating between processor 1004 and system memory 1006.

Depending on the desired configuration, processor 1004 may be of any type including but not limited to a microprocessor (µP), a microcontroller (µC), a digital signal processor (DSP), or any combination thereof. Processor 1004 may include one more levels of caching, such as a level one cache 1010 and a level two cache 1012, a processor core 1014, and registers 1016. An example processor core 1014 may include an arithmetic logic unit (ALU), a floating point unit (FPU), a digital signal processing core (DSP Core), or any combination thereof. An example memory controller 1018 may also be used with processor 1004, or in some implementations memory controller 1018 may be an internal part of processor 1004.

Depending on the desired configuration, system memory 1006 may be of any type including but not limited to volatile memory (such as RAM), non-volatile memory (such as ROM, flash memory, etc.) or any combination thereof. System memory 1006 may include an operating system 1020, one or more applications 1022, and program data 1024. Application 1022 may include a beam formation application 1026 that is arranged to perform at least some of the operations as described herein including at least some of those described with respect to methods 700-900 of FIGS. 7-9. Program Data 1024 may include beam formation information 1028 that may be useful for beam formation by the beam formation module 180, and/or may include other information usable and/or generated by the various other modules/components described herein. In some embodiments, application 1022 may be arranged to operate with program data 1024 on operating system 1020 such that virtual spot beams are generated as described herein. This described basic configuration 1002 is illustrated in FIG. 10 by those components within the inner dashed line.

Computing device 1000 may have additional features or functionality, and additional interfaces to facilitate communications between basic configuration 1002 and any required devices and interfaces. For example, a bus/interface controller 1030 may be used to facilitate communications between basic configuration 1002 and one or more data storage devices 1032 via a storage interface bus 1034. Data storage devices 1032 may be removable storage devices 1036, non-removable storage devices 1038, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 1006, removable storage devices 1036 and non-removable storage devices 1038 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 1000. Any such computer storage media may be part of computing device 1000.

Computing device 1000 may also include an interface bus 1040 for facilitating communication from various interface devices (e.g., output devices 1042, peripheral interfaces 1044, and communication devices 1046) to basic configuration 1002 via bus/interface controller 1030. Example output devices 1042 include a graphics processing unit 1048 and an audio processing unit 1050, which may be configured to communicate to various external devices such as a display or speakers via one or more A/V ports 1052. Example peripheral interfaces 1044 include a serial interface controller 1054 or a parallel interface controller 1056, which may be configured to communicate with external devices such as input devices (e.g., keyboard, mouse, pen, voice input device, touch input device, etc.) or other peripheral devices (e.g., printer, scanner, etc.) via one or more I/O ports 1058. An example communication device 1046 includes a network controller 1060, which may be arranged to facilitate communications with one or more other computing devices 1062 over a network communication link via one or more communication ports 1064.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1000 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. This disclosure is not limited to particular methods, reagents, compounds compositions or biological systems, which can, of course, vary. The terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

The use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware are possible in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. Such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various embodiments of the present disclosure have been described herein for purposes of illustration, and various modifications may be made without departing from the scope and spirit of the present disclosure. Accordingly, the various embodiments disclosed herein are not intended to be limiting, with the true scope and spirit being indicated by the following claims.

What is claimed is:

1. A satellite system to generate a plurality of beamformed outputs from one or more input antenna signals, the satellite system comprising:
a plurality of channel breakout modules configured to receive respective unique input antenna signals that represent channels of a common radio frequency (RF) signal received from a remote source and to break each unique input antenna signal into a plurality of channel components;
a switch module coupled to the plurality of channel breakout modules and configured to receive the plurality of channel components from the plurality of channel breakout modules and to match equivalent channel components from each of the unique input antenna signals; and
a plurality of beam formation operation modules coupled to the switch module, wherein each beam formation operation module is configured to receive a set of equivalent channel components that have been matched by the switch module and to perform a beam formation operation on the set of equivalent channel components to generate a beamformed output for the set of equivalent channel components.

2. The satellite system of claim 1, further comprising:
one or more antennas coupled to at least one of the plurality of channel breakout modules and configured to receive one of the unique input antenna signals from the remote source.

3. The satellite system of claim 2, wherein the one or more antennas include phased array antennas.

4. The satellite system of claim 2, further comprising:
a down converter coupled to the one or more antennas and configured to down convert each of the unique input antenna signals to a digital baseband signal prior to the unique input antenna signals being received by the plurality of channel breakout modules.

5. The satellite system of claim 1 further comprising:
a reconstruction module coupled to the plurality of beam formation operation modules and configured to receive the generated beamformed output from each beam formation operation module and to place the plurality of beamformed outputs into a form that is usable by other components of the satellite system, wherein the plurality of beamformed outputs include digital baseband signals.

6. The satellite system of claim 1, wherein the beam formation operation comprises a space-frequency adaptive processing operation.

7. The satellite system of claim 1, wherein each beam formation operation module is configured to perform the beam formation operation in a frequency domain.

8. The satellite system of claim 7, wherein each beam formation operation module is configured to perform multiple frequency-specific weighted summations as part of the beam formation operation in the frequency domain.

9. The satellite system of claim 8, wherein each beam formation module is configured to perform each weighted summation by use of weight coefficients that are obtained using an adaptive beaming formation operation.

10. The satellite system of claim 9, wherein the adaptive beaming formation operation includes one of a minimum power distortionless response or a minimum variance distortionless response.

11. The satellite system of claim 9, wherein each beam formation operations module is configured to use steerage vectors to compute the weight coefficients, and wherein the weight coefficients are determined based on the input antenna signals.

12. The satellite system of claim 1, wherein the plurality of beam formation operation modules comprises:
a plurality of first modules configured to receive the set of equivalent channel components that have been matched by the switch module and to break each channel component into a plurality of frequency components that comprise each channel component;

a plurality of frequency-specific beamformer modules coupled to a plurality of second modules and configured to receive a given one of the plurality of frequency components from each channel component and to perform the beam formation operation; and a second module coupled to the plurality of frequency-specific beamformer modules and configured to receive outputs from each of the plurality of frequency-specific beamformer modules and to combine the outputs to generate the beamformed output.

13. The satellite system of claim 12, wherein the plurality of first modules include fast Fourier transform (FFT) modules configured to convert the equivalent channel components into frequency domain components.

14. The satellite system of claim 12, wherein the second module includes an inverse fast Fourier transform (iFFT) module.

15. A method to generate a plurality of virtual beamformed outputs from one or more input antenna signals, the method comprising:

receiving a plurality of physical input antenna signals that represent a common radio frequency (RF) signal from a remote source;

dividing the physical input antenna signals into a plurality of channel components;

matching equivalent channel components from each input antenna signal with like channel components; and performing a beam formation operation on the equivalent channel components to generate the plurality of virtual beamformed outputs for each channel component.

16. The method of claim 15, wherein the generation of the plurality of virtual beamformed outputs includes generation of digital baseband signals.

17. The method of claim 15, further comprising:

combining the plurality of virtual beamformed outputs into one or more new physical antenna signals that are configurable to be further processed.

18. The method of claim 15, wherein the beam formation operation is performed in a frequency domain, wherein the beam formation operation in the frequency domain comprises multiple frequency-specific weighted summations, wherein each weighted summation includes weight coefficients that are obtained using an adaptive beaming formation operation, wherein the adaptive beaming formation operation includes a minimum power distortionless response, wherein the input antenna signal is used to determine steerage vectors, and wherein the steerage vectors are used to compute the weight coefficients.

19. The method of claim 15, wherein the beam formation operation includes a minimum variance distortionless response.

20. The method of claim 15, further comprising:

dividing each channel component into a plurality of frequency components that comprise each channel component;

subjecting each frequency component to the beam formation operation; and combining each of the plurality of frequency components that have been subjected to the beam formation operation to generate a virtual beamformed output.

21. A system to generate a plurality of virtual spot beams from one or more physical spot beams, the system comprising:

a first antenna configured to provide a first physical spot beam that represents an radio frequency (RF) signal received from a remote source;

a second antenna configured to provide a second physical spot beam that represents the RF signal received from the remote source; and a beam formation module communicatively coupled to the first and second antennas and configured to perform a beam formation operation on the first and second physical spot beams to generate one or more virtual spot beams.

22. The system of claim 21, wherein the first and second antennas include phase array antennas.

23. The system of claim 21, wherein the beam formation operation comprises a space-frequency adaptive processing operation, wherein the beam formation module is configured to perform the beam formation operation in a frequency domain, wherein the beam formation module is configured to perform multiple frequency-specific weighted summations as part of the beam formation operation in the frequency domain, wherein the beam formation module is configured to perform each weighted summation by use of weight coefficients that are obtained by use of an adaptive beaming formation operation, wherein the adaptive beaming formation operation includes a minimum power distortionless response, wherein the beam formation module is configured to use steerage vectors to compute the weight coefficients, wherein the weight coefficients are determined based on the first and second physical spot beams, and wherein the first and second physical spot beams include digital baseband signals prior to being received by the beam formation module.

24. The system of claim 21, wherein the beam formation operation includes a minimum variance distortionless response.

25. The system of claim 21, wherein the beam formation module comprises:

a plurality of first modules configured to break the first and second physical spot beams into a plurality of frequency components;

a plurality of frequency-specific beam formation modules coupled to the plurality of first modules and configured to receive a given one of the frequency components and to perform the beam formation operation; and a second module coupled to the plurality of frequency-specific beam formation modules and configured to receive outputs from each of the plurality of frequency-specific beam formation modules and to combine the outputs to generate the one or more virtual spot beams.

26. A method to generate a plurality of virtual spot beams from one or more physical spot beams, the method comprising:

receiving a common radio frequency (RF) signal from one or more remote sources at a plurality of antennas;

providing a first physical spot beam from a first antenna of the plurality of antennas to a beam formation module, wherein the first physical spot beam is representative of all common RF signals;

providing at least a second physical spot beam from a second antenna of the plurality of antennas to the beam formation module, wherein the second physical spot beam is also representative of the common RF signals; and performing a beam formation operation by the beam formation module to generate one or more virtual spot beams.

27. The method of claim 26, wherein providing the first physical spot beam from the first antenna and providing the at least second physical spot beam from the second antenna comprise providing the first physical spot beam and the at least second physical spot beam from phase array antennas.

28. The method of claim 26, wherein the beam formation operation is performed in a frequency domain, wherein the beam formation operation in the frequency domain comprises multiple frequency-specific weighted summations, wherein each weighted summation involves weight coefficients that are obtained using an adaptive beaming formation operation, wherein the adaptive beaming formation operation includes a minimum power distortionless response, wherein steerage vectors are used to compute the weight coefficients, and wherein the weight coefficients are determined based on the first and the at least second physical spot beams.

29. The method of claim 26, wherein the beam formation operation includes a minimum variance distortionless response.

30. A method to generate a new spot beam, the method comprising:
    receiving a first spot beam from a first antenna, wherein the first spot beam comprises a plurality of first communication channels to communicate data from a remote source;
    receiving a second spot beam from a second antenna, wherein the second spot beam is different from the first spot beam, and wherein the second spot beam comprises a plurality of second communication channels to communicate data from the remote source;
    dividing the first spot beam into first communication channel components, wherein each first communication channel component comprises a plurality of first frequency components;
    dividing the second spot beam into second communication channel components, wherein each second communication channel component comprises a plurality of second frequency components;
    matching the first communication channel components with corresponding second communication channel components;
    performing a beam formation operation on each first frequency component and second frequency component of each corresponding matched first and second communication channel components, wherein the beam formation operation includes filtering signal components from each of the first and second frequency components; and
    combining the output of the beam formation operation of each first frequency component and second frequency component to generate the new spot beam, wherein the new spot beam comprises one or more signal channels and is substantially more focused on a target than the first and second spot beams.

31. The method of claim 30, wherein the beam formation operation is performed in a frequency domain, wherein the beam formation operation in the frequency domain comprises multiple frequency-specific weighted summations, wherein each weighted summation includes weight coefficients that are obtained using an adaptive beaming formation operation, wherein the adaptive beaming formation operation includes a minimum power distortionless response, wherein steerage vectors are used to compute the weight coefficients, and wherein the weight coefficients are determined based on the first and the second spot beams.

32. The method of claim 30, wherein the beam formation operation includes a minimum variance distortionless response.

33. The method of claim 30, wherein receiving the first spot beam from the first antenna and receiving the second spot beam from the second antenna comprise receiving the first spot beam and the second spot beam from phase array antennas.

* * * * *

UNITED STATES PATENT AND TRADEMARK OFFICE
CERTIFICATE OF CORRECTION

PATENT NO. : 9,876,562 B2
APPLICATION NO. : 14/760951
DATED : January 23, 2018
INVENTOR(S) : Hall Page 1 of 2

It is certified that error appears in the above-identified patent and that said Letters Patent is hereby corrected as shown below:

In the Drawings

In Fig. 7, Sheet 11 of 14, for Tag "730", Line 1, delete "From" and insert -- Form --, therefor.

In Fig. 10, Sheet 14 of 14, delete "Interface Bus 1020" and insert -- Interface Bus 1040 --, therefor.

In the Specification

In Column 3, Line 12, delete "spot beam" and insert -- spot beam. --, therefor.

In Column 4, Line 62, delete "It many" and insert -- In many --, therefor.

In Column 5, Line 43, delete "250, 270, and" and insert -- 260, 270 and --, therefor.

In Column 7, Lines 49-50, delete "beam formation modules 320" and insert -- beam formation operation modules 320 --, therefor.

In Column 16, Line 45, delete ""(Combing" and insert -- "(Combining --, therefor.

In Column 17, Line 10, delete "one more" and insert -- one or more --, therefor.

In Column 17, Line 18, delete "implementations memory" and insert -- implementations, memory --, therefor.

In Column 19, Line 51, delete "hard disk drive, a CD, a DVD," and insert -- hard disk drive (HDD), a compact disk (CD), a digital versatile disk (DVD), --, therefor.

In Column 19, Lines 54-55, delete "communications link," and insert -- communication link, --, therefor.

Signed and Sealed this
Nineteenth Day of June, 2018

Andrei Iancu
*Director of the United States Patent and Trademark Office*

CERTIFICATE OF CORRECTION (continued)
U.S. Pat. No. 9,876,562 B2

In Column 20, Line 51, delete "recitation no" and insert -- recitation, no --, therefor.

In Column 21, Line 6, delete "general such" and insert -- general, such --, therefor.

In Column 21, Line 13, delete "general such" and insert -- general, such --, therefor.

In the Claims

In Column 22, Line 57, in Claim 11, delete "operations module" and insert -- operation module --, therefor.